(12) United States Patent
Hattori et al.

(10) Patent No.: US 8,516,479 B2
(45) Date of Patent: Aug. 20, 2013

(54) VIRTUAL MACHINE SYSTEM AND METHOD FOR CONTROLLING INTERRUPT THEREOF

(75) Inventors: Naoya Hattori, Kokubunji (JP); Toshiomi Moriki, Kokubunji (JP); Takashige Baba, Inagi (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 884 days.

(21) Appl. No.: 12/624,827

(22) Filed: Nov. 24, 2009

(65) Prior Publication Data

US 2010/0138208 A1      Jun. 3, 2010

(30) Foreign Application Priority Data

Nov. 28, 2008   (JP) ................................. 2008-304492

(51) Int. Cl.
*G06F 9/455*   (2006.01)
(52) U.S. Cl.
USPC .......................................................... 718/1
(58) Field of Classification Search
USPC .......................................................... 718/1
See application file for complete search history.

(56) References Cited

U.S. PATENT DOCUMENTS

| | | | |
|---|---|---|---|
| 5,109,489 A | 4/1992 | Umeno et al. | |
| 2003/0212929 A1* | 11/2003 | Sekizawa ........................ | 714/47 |
| 2005/0132365 A1* | 6/2005 | Madukkarumukumana et al. ................................ | 718/1 |
| 2007/0016710 A1* | 1/2007 | Kimelman et al. ............ | 710/264 |
| 2007/0157197 A1* | 7/2007 | Neiger et al. ...................... | 718/1 |
| 2008/0005297 A1* | 1/2008 | Kjos et al. ...................... | 709/223 |
| 2008/0162800 A1 | 7/2008 | Takashige et al. | |
| 2008/0276028 A1* | 11/2008 | Shah .............................. | 710/266 |
| 2008/0294808 A1* | 11/2008 | Mahalingam et al. ........... | 710/26 |
| 2008/0294825 A1* | 11/2008 | Mahalingam et al. ......... | 710/262 |
| 2009/0106754 A1* | 4/2009 | Liu et al. ........................... | 718/1 |

FOREIGN PATENT DOCUMENTS

| | | |
|---|---|---|
| JP | 11-282815 | 10/1999 |
| JP | 2008-146566 | 6/2008 |

OTHER PUBLICATIONS

Intel Corp.; Intel 64 and IA-32 Architecture Software Developer's Manual; System Programming Guide Part 2, Sep. 2008; retrieved on Oct. 1, 2008, Chapter 29-3, vol. 3B.
JP Office Action for Japanese Application No. 2008-304492, issued on May 28, 2013.

* cited by examiner

*Primary Examiner* — Emerson Puente
*Assistant Examiner* — Steven Do
(74) *Attorney, Agent, or Firm* — Antonelli, Terry, Stout & Kraus, LLP.

(57) ABSTRACT

A VMM disables an interrupt interception flag on at least one CPU to execute, upon reception of an interrupt, an interrupt handler code of an OS, and enables the interrupt interception flag on the at least one CPU to execute, upon the reception of the interrupt, an emulator in the VMM. When, to a virtual machine, an I/O device is assigned in a dedicated form, and when the CPU is assigned while the interrupt interception is disabled, a destination of the interrupt from the physical I/O device is set to the corresponding CPU on which the interrupt interception is disabled. When, to the virtual machine, the I/O device is assigned in a shared form, or when the CPU is assigned while the interrupt interception is disabled, the destination of the interrupt from the physical I/O device is set to the corresponding CPU on which the interrupt interception is enabled.

19 Claims, 24 Drawing Sheets

460 ASSIGNMENT PRELIMINARY INPUT TABLE

| 441 VIRTUAL MACHINE NUMBER | 462 OPERATION STATE | 463 ASSIGNED MEMORY QUANTITY | 464 EXCLUSIVE CPU COUNT | 465 MUTUAL CPU COUNT | 466 VIRTUAL I/O DEVICE ASSIGNMENT PRESENCE/ABSENCE — 433 PHYSICAL I/O DEVICE USAGE FORM | | |
|---|---|---|---|---|---|---|---|
| | | | | | DEVICE 1 (DEDICATED) | DEVICE 2 (SHARED) | ··· DEVICE N (SHARED) |
| 1 | ACT | 2GB | 3 | 0 | ○ | ○ | ··· - |
| 2 | DEACT | 1GB | 0 | 5 | — | ○ | ··· ○ |
| ⋮ | ⋮ | ⋮ | ⋮ | ⋮ | ⋮ | ⋮ | ⋮ |
| n | DEACT | 0GB | 0 | 0 | — | — | ··· - |

*FIG. 5*

| 420 PHYSICAL CPU MANAGEMENT TABLE ||
|---|---|
| 421 PHYSICAL CPU NUMBER | 422 PHYSICAL CPU USAGE FORM |
| 0 | EXCLUSIVE |
| 1 | SHARE |
| : | : |

*FIG. 6*

| 430 PHYSICAL I/O DEVICE MANAGEMENT TABLE |||
|---|---|---|
| 431 PHYSICAL I/O DEVICE NUMBER | 433 PHYSICAL I/O DEVICE USAGE FORM | 434 INITIALIZATION FLAG |
| 0 | DEDICATED | — |
| 1 | SHARED | INITIALIZED |
| : | : | : |

*FIG. 7*

| 440 VIRTUAL CPU MANAGEMENT TABLE | | |
| --- | --- | --- |
| 441 VIRTUAL MACHINE NUMBER | 442 VIRTUAL CPU NUMBER | 421 PHYSICAL CPU NUMBER |
| 0 | 0 | CPU0 |
| 1 | 0 | — |
| : | : | : |

FIG. 8

| 450 VIRTUAL I/O DEVICE MANAGEMENT TABLE | | |
| --- | --- | --- |
| 441 VIRTUAL MACHINE NUMBER | 452 VIRTUAL I/O DEVICE NUMBER | 431 PHYSICAL I/O DEVICE NUMBER |
| 0 | 0 | 0 |
| 0 | 1 | 1 |
| : | : | : |

FIG. 9

| 400 INTERRUPT REMAPPING TABLE | | |
| --- | --- | --- |
| 280 REMAPPING ID | 230 DESTINATION | 240 VECTOR |
| 0 | 0 | 0x31 |
| 1 | 0 | 0x4C |
| ⋮ | ⋮ | ⋮ |
| 65535 | 2 | 0x95 |

*FIG. 23*

VIRTUAL MACHINE SYSTEM AND METHOD FOR CONTROLLING INTERRUPT THEREOF

CLAIM OF PRIORITY

The present application claims priority from Japanese patent application JP2008-304492 filed on Nov. 28, 2008, the content of which is hereby incorporated by reference into this application.

BACKGROUND

This invention relates to a virtual machine system, and a technology of delivering, to an OS operating on a virtual machine, an interrupt from an I/O device.

Along with an increase in number of servers, complexity relating to operation thereof has increased, pausing a problem of an operation cost, and thus, as a technology of reducing the operation cost, server integration, which integrates a plurality of servers together into one server, has been attracting attention. As a technology for enabling the server integration, a virtual machine technology, which logically divides one computer at arbitrary ratios, is known. In the virtual machine technology, for example, firmware (or middleware) such as a hypervisor divides a physical machine into a plurality of logical partitions (LAPRs), assigns, to each LPAR, computer resources (CPUs, memories, and I/O devices), and runs, on the each LAPR, an OS. Alternatively, on one server, one host OS (OS which directly uses a physical machine) is executed, and a hypervisor operating on this host OS carries out a similar division process, thereby operating a plurality of guest OSs (OSs operating on the host OS). The virtual machine technology enables OSs conventionally operating on a plurality of servers and software operating on the OSs to operate on one server, thereby achieving the server integration.

The virtual machine technology such as the hypervisor is a technology which has been used in large computers such as mainframes. However, along with a recent increase in performance of the microprocessor, the virtual machine technology is becoming widespread in low-end servers and personal computers.

A computer such as a server employing the virtual machine technology includes a plurality of virtual machines for operating guests (general term referring to a guest OS and software programs operating on the guest OS), and virtual machine monitor (referred to as VMM hereinafter) for controlling the virtual machines.

Generally, the guest is configured such that hardware of a computer is dedicated thereto. Thus, when the server integration is realized by the virtual machine technology, it is necessary for each virtual machine to operate in the same manner as in the case in which the computer is dedicated to each guest. In order to meet this requirement, the VMM carries out emulation of a privileged instruction (instruction for operating hardware) and an interrupt, which is a notice of completion of hardware operation, contained in the guest. An overhead accompanying the emulation decreases the performance, and thus high-speed emulation is necessary.

A virtual machine includes virtual components such as a virtual CPU, virtualized physical memory, and a virtual I/O device. The VMM realizes each virtual component by assigning physical components (physical CPU, physical memory, and physical I/O device) in a dedicated or shared form. In the dedicated form, one physical component is assigned to only one virtual machine, and a part of emulator execution is unnecessary. In the shared form, a physical component is assigned to a plurality of virtual machines, and the execution of emulator is indispensable. When high performance is of primary importance, the dedicated form is used, and when high utilization efficiency of resources is of primary importance, the shared form is employed.

Conventionally, the emulator has often been implemented as software, and emulation assistance by hardware is limited to expensive computers such as mainframes. Consequently, on many computers, when a virtual machine is used, a significant overhead caused by software execution is present. However, in a computer provided with an inexpensive and widely-available x86-compatible CPU from Intel or AMD, in order to overcome the significant overhead, hardware for assisting the emulation of the virtualization feature is emerging as described below.

(1) For instruction execution by a CPU, the VT-x feature of Intel or the AMD-V feature of AMD assists the instruction execution relating to the virtualization. (2) For memory operation by the CPU, Extended Page Table (EPT) of Intel or Nested Page Table of AMD assists address translation. (3) For memory operation by an I/O device, VT-d of Intel or IOMMU of AMD assists address translation. (4) For I/O device operation by the CPU, SR-IOV of PCI-SIG assists the device operation.

With regard to assistance for the virtualization feature by hardware described above, for example, Chapter 29-3, Intel Corp., "Intel 64 and IA-32 Architectures Software Developer's Manual Volume 3B: System Programming Guide Part 2", September, 2008, retrieved on Oct. 1, 2008 (hereinafter, referred to as Related Art 1), describes an interrupt delivery technology using an External Interrupt Exiting feature implemented on an x68-compatible CPU. The External Interrupt Exiting is a feature to execute, upon a physical I/O device interrupt, virtualization software such as the VMM. The virtualization software enables the External Interrupt Exiting for all the CPUs and receives all interrupts from physical I/O devices. The virtualization software, which has received an interrupt, identifies the generation source of the interrupt, and, when the generation source is an I/O device assigned in the dedicated form, branches processing of a virtual CPU to an interrupt handler of the OS. When the generation source is a shared I/O device, the virtualization software executes an emulator, and branches processing of the virtual CPU to the interrupt handler of the OS.

Moreover, U.S. Pat. No. 5,109,489 (hereinafter, referred to as Related Art 2) describes an interrupt delivery technology for a general-purpose computer. In this technology, an interrupt delivered from an I/O device assigned in the dedicated form, and an interrupt delivered from an I/O device assigned in the shared form are discriminated from each other, and the interrupt delivered from an I/O device assigned in the dedicated form is directly branched to an interrupt handler of an OS without routing through virtualization software. When this feature is used, for the interrupt delivered from an I/O device assigned in the shared form, a CPU calls the virtualization software. The virtualization software sets, to the CPU, a form of assignment of the I/O device, and executes the emulator for the interrupt from the shared I/O device. Moreover, after the execution of the emulator, the virtualization software branches the processing of the virtual. CPU to the interrupt handler of the OS.

SUMMARY

However, on an x86-compatible machine, for an interrupt delivery corresponding to a CPU operation by an I/O device (5), an assistance feature (hardware-assist) is not provided for the following reasons. Generally, addition of the assistance feature to a CPU causes a decrease in operation frequency and an increase in power consumption. In the case of the x86-compatible CPU, CPUs of the same specifications are used for a wide range of applications from servers to embedded devices, and thus, an assistance feature which may degrade the operation frequency and the power consumption is avoided unless an overhead of the interrupt delivery is significant. The overhead of the interrupt delivery is smaller by an order of magnitude than others, and thus, the provision of the assistance feature is avoided.

Due to advent of various types of assistance features, significant overheads have been reduced, and the overhead (5) has become dominant as an overhead accompanying the virtual machine. Thus, in order to further reduce the overheads, the reduction of the overhead caused by the interrupt delivery is an object for the x86-compatible machines.

In the above-mentioned Related Art 1, regardless of the form of the assignment of an I/O device, the virtualization software receives an interrupt, and branches the processing of the CPU to the handler of the OS. In Related Art 1, minimum required processing is performed for a shared I/O device while, for an I/O device assigned in the dedicated form, essentially, it is not necessary to call the virtualization software. Thus, it is an object to reduce the overhead of the interrupt delivery from the I/O device assigned in the dedicated form.

In the above-mentioned Related Art 2, high speed is achieved by the hardware assistance feature intended for general-purpose machines in which the operation frequency and the power consumption are not significant problems. Support of this assistance feature is not currently planned for the widely available x86-compatible machines, and thus, relaxing the restriction imposed on hardware required for application of this technology is an object.

In view of the above-mentioned problems, this invention has an object to, by using only standard features supported by x86-compatible machines, simultaneously achieve a reduction in overhead of an interrupt from an I/O device assigned in a dedicated form, and emulator execution required for an I/O device assigned in a shared form.

A representative aspect of this invention is as follows.

A control method for a virtual machine for executing a virtualization module for providing a virtual machine operating on a physical machine, the physical machine comprising: a plurality of physical CPUs; and a physical memory, the virtualization module comprising a predetermined emulator, the virtualization module operating an OS on the virtual machine, the plurality of physical CPUs being capable of setting an interrupt handler executed upon reception of an interrupt from the virtual machine, the control method comprising: executing, on at least one first physical CPU out of the plurality of physical CPUs, the OS upon the reception of the interrupt; and executing, on at least one second physical CPU out of the plurality of physical CPUs, the predetermined emulator upon the reception of the interrupt.

According to this invention, the interrupt delivery overhead can be reduced in the case in which the interrupt from the dedicated I/O device assigned in the first form is received by the CPU on which the interrupt interception is disabled, and the interrupt from the shared I/O device assigned in the second from is always received by the CPU on which the interrupt interception is enabled, thereby enabling the emulator to be executed. As a result, it is possible to realize both the reduction in overhead of the interrupt from the I/O device assigned in the dedicated form, and the execution of the emulator required for the I/O device assigned in the shared form.

BRIEF DESCRIPTION OF THE DRAWINGS

FIG. 5 illustrates the first and second embodiment of this invention, and is a configuration diagram illustrating a format of the assignment preliminary input table 460 constituting the resource management table 410.

FIG. 6 illustrates the first and second embodiment of this invention, and is a configuration diagram illustrating a format of the physical CPU management table 420 constituting the resource management table 410.

FIG. 7 illustrates the first and second embodiment of this invention, and is a configuration diagram illustrating a format of the physical I/O device management table 430 constituting the resource management table 410.

FIG. 8 illustrates the first and second embodiment of this invention, and is a configuration diagram illustrating a format of the virtual CPU management table 440 constituting the resource management table 410.

FIG. 9 illustrates the first and second embodiment of this invention, and is a configuration diagram illustrating a format of the virtual I/O device management table 450 constituting the resource management table 410.

FIG. 23 illustrates the second embodiment, and is an explanatory diagram illustrating the interrupt remapping table.

DETAILED DESCRIPTION OF THE PREFERRED EMBODIMENTS

A description is now given of embodiments of this invention with reference to the accompanying drawings.

First Embodiment

According to this embodiment, with regard to the assignment of a CPU to a virtual machine, only an exclusive form in which a physical CPU is dedicated for a single virtual machine, and interrupt interception is disabled, and a mutual form in which a physical CPU is shared by a plurality of virtual machines, and the interrupt interception is enabled are permitted.

(1. Hardware Configuration)

Figure 1:
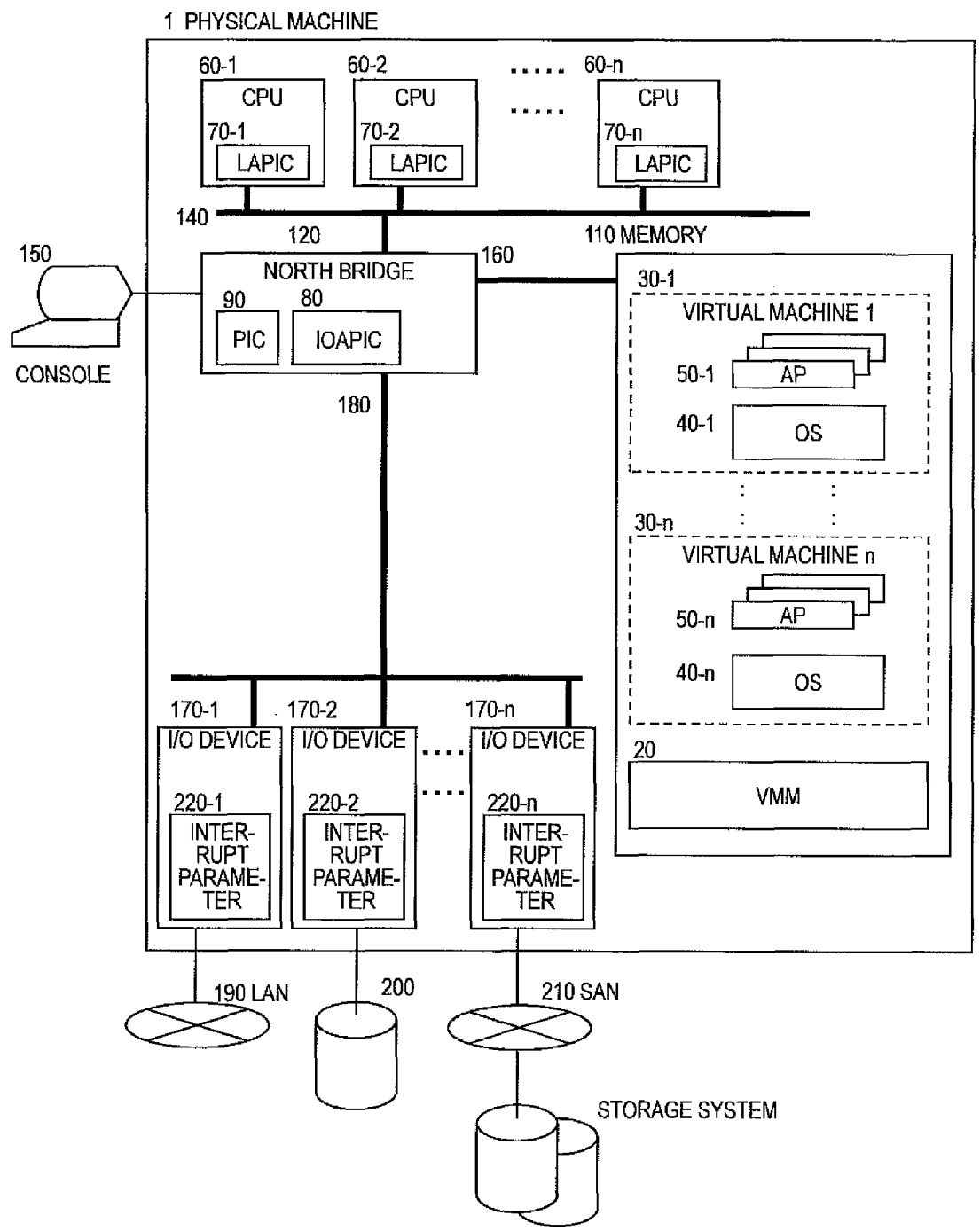
FIG. 1 illustrates a first embodiment of this invention, and represents a configuration of a physical machine 1 operating a virtual machine system.

FIG. 1 illustrates a first embodiment of this invention, and represents a configuration of a physical machine 1 operating a virtual machine system. The physical machine 1 includes at least two CPUs (or processors) 60 compatible with x86 (or IA-32) and ready for the VT-x or AMD-V, which are virtualization assistance features. Those CPUs 60-1 to 60-*n* are connected via an inter-CPU interface 140 represented by the front side bus (FSB) to a north bridge 120 (or memory controller). The CPU 60-1, which is the first CPU, is a boot strap processor (BSP) which starts operation immediately after the boot. The CPUs 60-2 to 60-*n* are second and subsequent CPUs, and are application processors (APs) which start operation upon reception of an instruction from the BSP. It should be noted that, in the following description, the respective CPUs are denoted by 60-1 to 60-*n*, and the CPUs are generally referred to as CPU 60.

To the north bridge 120, via a memory bus 160, a memory 110 is connected, and, via a bus 180, I/O devices 170 are connected. The I/O devices 170 are a network adapter connected to a LAN 190, a SCSI adapter connected to a disk drive 200 and the like, a Fibre Channel adapter connected to a storage area network (SAN) 210, and the like.

The CPU 60, via the north bridge 120, makes access to the memory 110, and makes access from the north bridge 120 to the I/O devices 170-1 to 170-*n*, thereby carrying out predetermined processes. As the I/O devices 170-1 to 170-*n*, an example is illustrated in which the I/O device 170-1 is a network adapter connected to the network 190, the I/O device 170-2 is a disk adapter (such as SCSI) connected to the HDD 200, and the I/O device 170-*n* is a Fibre Channel adapter (or host bus adapter (HBA)) connected to a storage system via the SAN 210. In the following description, the respective I/O devices are denoted by 170-1 to 170-*n*, and the I/O devices are generally referred to as I/O device 170.

The north bridge 120 controls the memory 110 as well as is connected to a console 150, which includes a graphic controller and carries out input to/output from the operator, thereby displaying images.

To the memory 110, a virtual machine monitor (VMM hereinafter) 20 is loaded, and a virtual machine 30 realized by this VMM 20 executes an OS 40. The OS 40 executes arbitrary applications (APs) 50 on the virtual machine 30.

For the interrupt delivery, the I/O device 170 includes interrupt parameters 220 which define a destination CPU of delivery of interrupt, and delivery means. When an interrupt is generated on the I/O device 170, via the bus 180, the interrupt is delivered to the north bridge 120. The north bridge 120 includes a programmable interrupt controller (PIC) 90 and an I/O advanced PIC (IOAPIC) 80. When a message signaled interrupt (MSI) is disabled by setting of the interrupt parameters 220, an interrupt is stored in the PIC 90, and is also stored in a local advanced PIC (LAPIC) 70 in the CPU 60 according to register setting in the IOAPIC 80. When the MSI is enabled by the setting of the interrupt parameters 220, an interrupt is stored only in the LAPIC 70. The stored interrupts are consumed when the CPU 60 enables the interrupt, and the CPU 60 then starts a process which is to be carried out upon reception of an interrupt.

It should be noted that the VMM 20 is stored in the HDD 200 or the storage system as machine-readable medium, and is loaded to the memory 110 upon the boot of the physical machine 1, to be executed by the CPU 60.

Moreover, though FIG. 1 illustrates the example in which the memory controller is integrated into the north bridge 120, the CPU 60 may be provided with the memory controller. In this case, each CPU 60 is provided with the memory bus 160, and is connected to the memory 110.

(2. Software Configuration)

Figure 2:
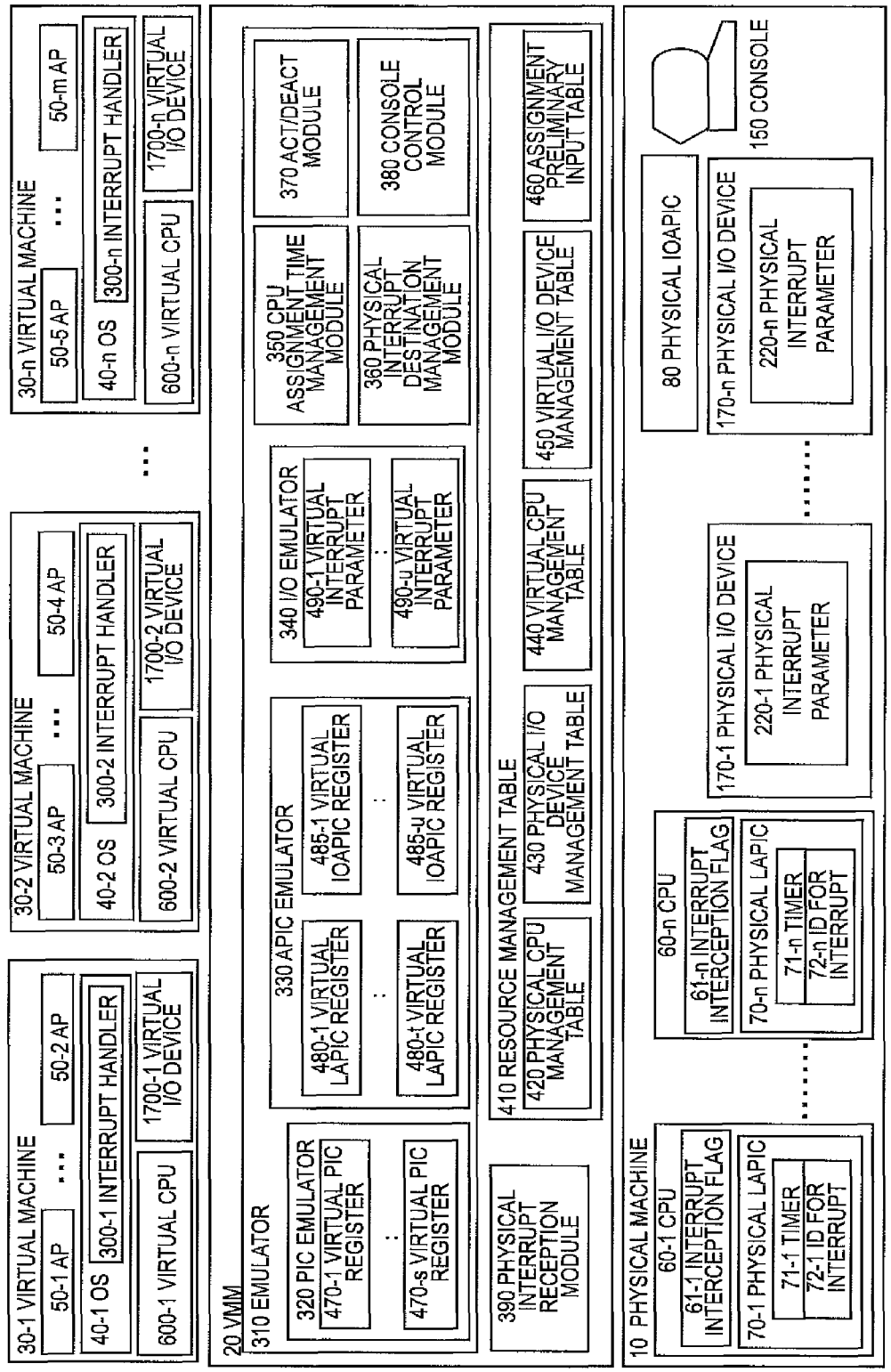
FIG. 2 illustrates the first embodiment of this invention, and is a stack diagram illustrating major parts of the software and hardware of the virtual machine system.

Next, referring to FIG. 2, a detailed description is given of main portions of a configuration of software realizing the virtual machine 30 on the physical machine 1, and hardware elements subject to control. FIG. 2 is a stack diagram illustrating major parts of the software and hardware of the virtual machine system.

On the physical machine 1, the VMM 20 managing the plurality of virtual machines 30-1 to 30-*n* are operating. On each virtual machine (virtualization module) 30, the VMM 20 provides virtual CPUs 600-1 to 600-*n*, and virtual I/O devices 1700-1 to 1700-*n*, and at least one OS 40-1 to 40-*n* operates. Moreover, on the OS 40, at least one application program (AP 50) operates. It should be noted that, in the following description, the respective virtual machines are denoted by 30-1 to 30-*n*, and the virtual machines are generally referred to as virtual machine 30. Similarly, the respective OSs are denoted by 40-1 to 40-*n*, and the OSs are generally referred to as OS 40. The respective virtual CPUs are denoted by 600-1 to 600-*n*, and the virtual CPUs are generally referred to as virtual CPU 600. The respective virtual I/O devices are denoted by 1700-1 to 1700-*n*, and the virtual I/O devices are generally referred to as virtual I/O device 1700. The virtual CPU 600-1, which is the first virtual CPU, is a virtual boot strap processor (BSP) which starts operation immediately after the boot of the virtual machine, and the CPUs 600-2 to 600-*n* are second and subsequent virtual. CPUs, and are virtual application processors (APs) which start operation upon reception of an instruction from the virtual BSP.

The OS 40 includes an interrupt handler 300 for receiving an interrupt from the I/O device 170 and controlling the I/O device 170. It should be noted that, in the following description, the respective interrupt handlers are denoted by 300-1 to 300-n, and the interrupt handlers are generally referred to as interrupt handler 300.

The VMM 20 includes an emulator 310 which emulates the CPU 60, the I/O device 170, the interrupt delivery, and the like, a physical interrupt reception module 390 called upon a physical interrupt, and a resource management table 410 defining assignments of the physical CPU 60 and the physical I/O device 170 to the virtual CPU 600 and the virtual I/O device 1700.

The emulator 310 includes a PIC emulator 320 for realizing shared assignment of the PIC 90, an APIC emulator 330 for realizing shared assignment of the APIC (generic name of the IOAPIC 80 and the LAPIC 70), an I/O emulator 340 for realizing shared assignment of the I/O device 170, a CPU assignment time management module 350 for realizing shared assignment of the CPU, a physical interrupt destination management module 360 maintaining the destination of an interrupt from the physical I/O device to the proper physical CPU, an ACT/DEACT module 370 for activating/deactivating the operation of the virtual machine, and a console control module 380 for controlling an interrupt interface of the CPU 60 and the I/O device 170.

The PIC emulator 320 includes virtual PIC registers 470-1 to 470-s respectively corresponding to two virtual PICs contained in each virtual machine 30. The virtual PIC registers 470-1 to 470-s contain an interrupt request register (IRR) (not shown) for storing interrupts, and the like. On the x86-compatible physical machine 1, the PIC 90 of the north bridge 120 is constituted by two PICs, and thus, the virtual PICs of the each virtual machine 30 is also constituted by two PICs.

The APIC emulator 330 includes virtual LAPIC registers 480-1 to 480-t corresponding to respective virtual LAPICs each of which is contained in the each virtual CPU 600, and virtual IOAPIC registers 485-1 to 485-u corresponding to respective virtual IOAPICs at least one of which is assigned to the each virtual machine 30. The virtual LAPIC registers 480-1 to 480-t contain an IRR (not shown) for storing interrupts, and the like. The virtual IOAPIC registers 485-1 to 485-u contain a destination field defining a CPU, which is a destination of an interrupt, and the like.

The I/O emulator 340 is a module for emulating operations of a network adapter, a Fibre Channel adapter, and the like. Moreover, the I/O emulator 340, for preparing for delivery of a virtual interrupt, holds virtual interrupt parameters 490-1 to 490-u of the respective virtual I/O devices 1700.

The CPU assignment time management module 350, in order to execute all the virtual CPUs 600 at ratios set in advance, manages assignment times of the virtual CPUs 600 to the physical CPUs 60, temporarily stops the virtual CPU 600 which has consumed the assigned time, and resumes an operation of another virtual CPU 600.

Upon the activation (ACT) of the virtual machine 30, the deactivation (DEACT) of the virtual machine 30, a change of the virtual interrupt parameter 490, and the like, the physical interrupt destination management module 360 changes the destination of an interrupt from the physical I/O device 170. When the physical I/O device 170 is assigned in the shared form, the destination of the interrupt is changed to the CPU 60 assigned in the mutual form. When the physical I/O device 170 is assigned in the dedicated form, and when the destination of an interrupt from the corresponding virtual I/O device 1700 is the virtual CPU 600 assigned in the mutual form, the destination of the interrupt from the physical I/O device 170 is set to any physical CPU 60 assigned in the mutual form. When the destination of an interrupt from the corresponding virtual I/O device 1700 is the virtual CPU 600 assigned in the exclusive form, the destination of the interrupt from the physical I/O device 170 is set to the physical CPU 60 in the exclusive form assigned to the virtual CPU 600.

The ACT/DEACT module 370, upon the activation or deactivation of the virtual machine 30, initializes or resets the physical I/O device 170 and data in the emulator 310.

The console control module 380 controls the console 150 used by a user to assign the I/O device 170 to the CPU 60.

The physical interrupt reception module 390 receives an interrupt from the physical I/O device 170, identifies the physical I/O device 170 which has generated the interrupt, and calls the emulator set to the each of the physical I/O devices 170-1 to 170-u in advance. For example, when the physical I/O device 170 which has generated the interrupt is a network adapter assigned in the shared form, the physical interrupt reception module 390 calls the I/O emulator 340 for emulating the network adapter.

The resource management table 410 is a table defining the assignments of the CPUs 60 and the I/O devices 170, and contains a physical CPU management table 420 for defining the assignments of the physical CPUs 60, a physical I/O device management table 430 for defining the assignments of the physical I/O devices 170, a virtual CPU management table 440 for defining the assignments of the virtual CPUs 600, a virtual I/O device management table 450 for defining the assignments of the virtual I/O devices 1700, and an assignment preliminary input table holding contents of the assignments of before the resources are confirmed.

The physical machine 1 includes at least two x86-compatible CPUs 60, at least one physical I/O device 170, at least one physical IOAPIC 80, and the console 150.

The CPUs 60-1 to 60-n include interrupt interception flags 61-1 to 61-n, and the physical LAPICs 70-1 to 70-n.

When each of the interrupt interception flags 61-1 to 61-n is enabled, the CPU 60 calls the physical interrupt reception module 390 owned by the VMM 20 upon reception of a maskable interrupt. On the other hand, when each of the interrupt interception flags 61-1 to 61-n is disabled, the CPU 60 calls the interrupt handler 300 of the OS 40 upon reception of a maskable interrupt.

The physical LAPICs 70-1 to 70-n respectively include timers 71-1 to 71-n and IDs for interrupt 72-1 to 72-n. The timers 71-1 to 71-n are used by the CPU assignment time management module 350 to measure a CPU time. The IDs for interrupt 72-1 to 72-n are numbers respectively used for uniquely identifying the physical LAPICs 70-1 to 70-n, and are used to define a destination of a physical interrupt.

The physical I/O devices 170 respectively contain the physical interrupt parameters 220-1 to 220-n, except for the case of legacy devices such as the serial port (RS232C).

The physical IOAPIC 80 is a device for holding the physical interrupt parameter 220 outside the physical I/O device 170 for legacy devices.

The console 150 is a user interface for selecting, to the virtual machine 30, whether the CPU is assigned in the exclusive form or the mutual form, and whether the I/O device is assigned in the dedicated form or the shared form.

Figure 3:
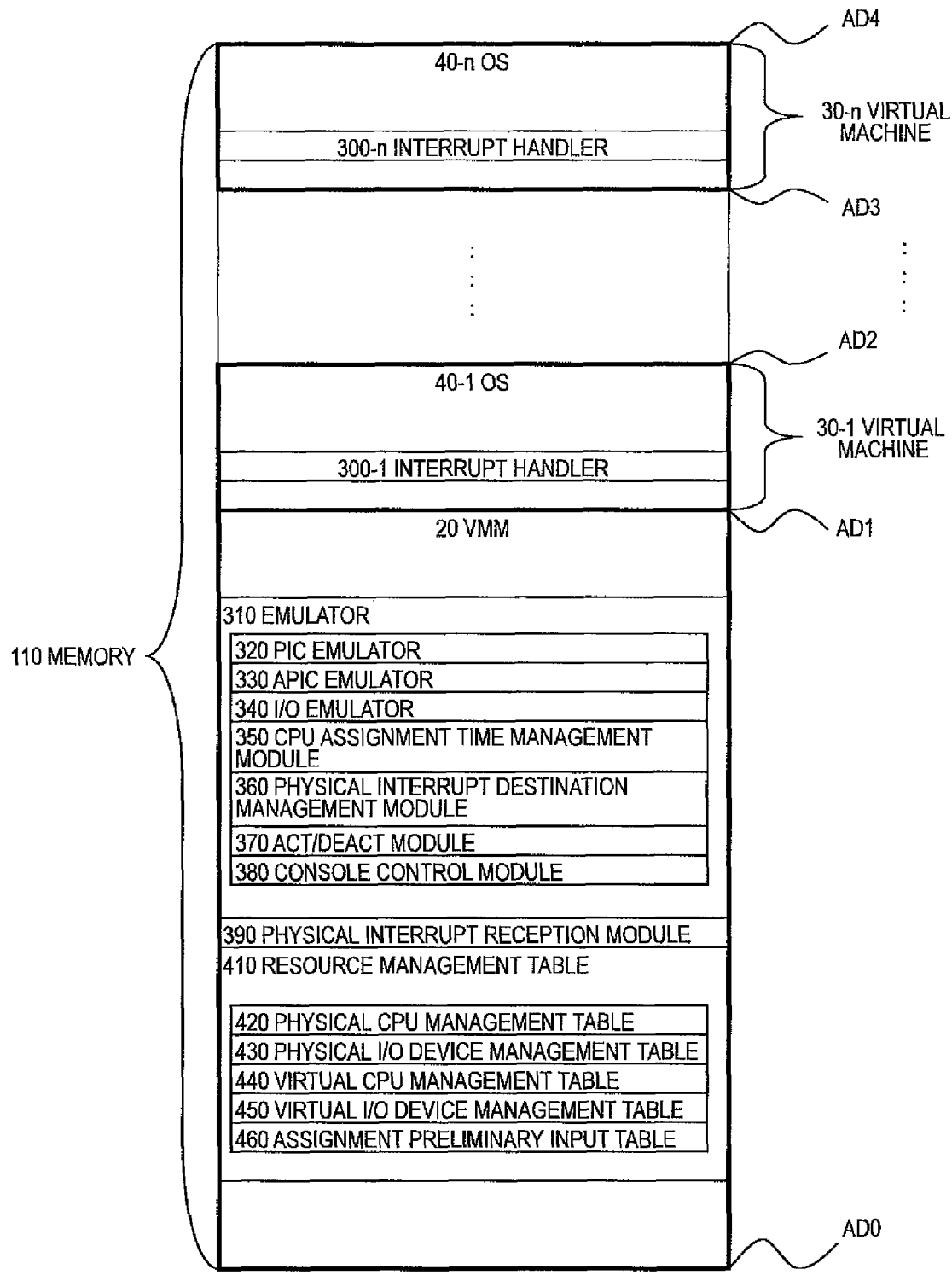
FIG. 3 illustrates the first embodiment of this invention, and is an example of the memory 110 managed by the VMM 20.

FIG. 3 illustrates an example of the memory 110 managed by the VMM 20.

The VMM 20 assigns, on the memory 110, an area for placing itself, and an area used by the virtual machines 30. For example, as illustrated in FIG. 3, the VMM 20 assigns, to itself, addresses AD0 to AD1, to the virtual machine 30-1, addresses AD1 to AD2, and to the virtual machine 30-n, addresses AD3 to AD4.

The area of the each virtual machine 30 contains the each OS 40, and the interrupt handler 300 of the each OS 40.

To the area used by the VMM 20, the emulator 310, the physical interrupt reception module 390, and the resource management table 410 are assigned.

Figure 4:
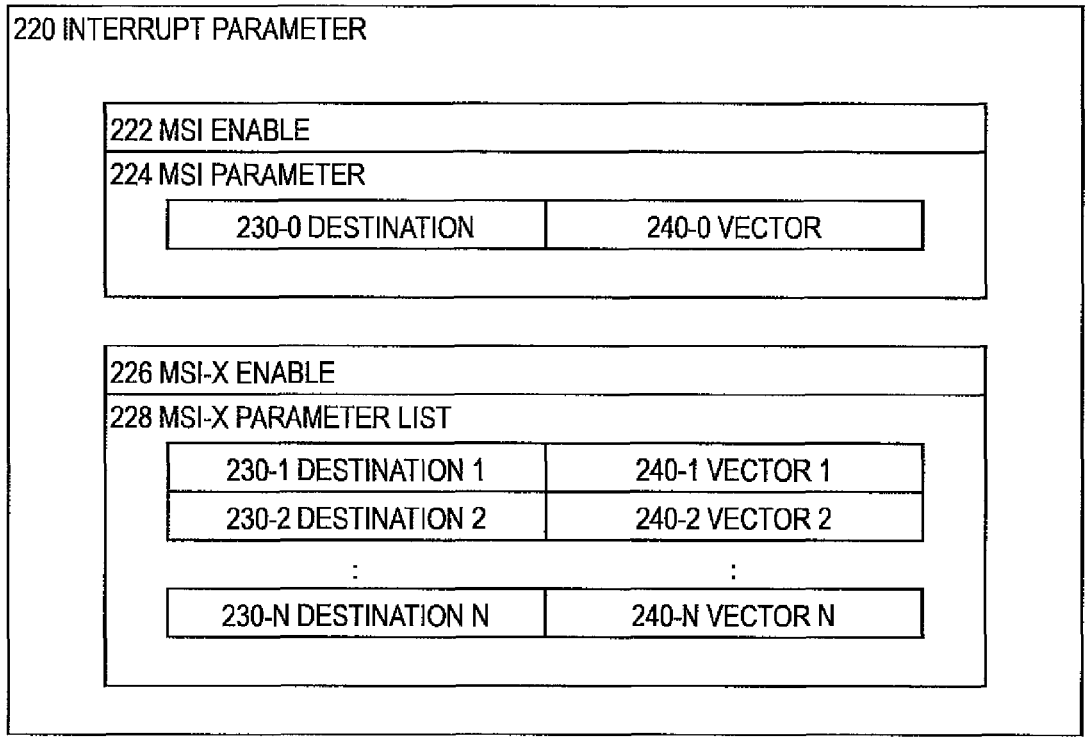
FIG. 4 illustrates the first embodiment of this invention, and is a configuration diagram of items contained in the interrupt parameter 220 of the I/O device 170.

FIG. 4 is a configuration diagram of items contained in the interrupt parameter 220 of the I/O device 170. The interrupt parameter 220 is constituted by an MSI Enable 222, an MSI parameter 224, an MSI-X Enable 226, and an MSI-X parameter list 228.

The MSI Enable 222 and the MSI-X Enable 226 are flags for respectively enabling/disabling the MSI and MSI-X. When the MSI Enable 222 is set to 1, and the MSI-X Enable 226 is set to 0, the MSI parameter 224 is used for specification of the destination of the interrupt, and the interrupt is stored only in the LAPIC 70. When the MSI Enable 222 is set to 0, and the MSI-X Enable 226 is set to 1, the MSI-X parameter list 228 is used for specification of the destination of the interrupt, and the interrupt is stored only in the LAPIC 70. When the MSI Enable 222 is set to 0, and the MSI-X Enable 226 is set to 0, a register set value of the physical IOAPIC 80 is used for specification of the destination of the interrupt, and the interrupt is stored both in the PIC 90 of the north bridge 120 and in the LAPIC 70 of the CPU 60.

The MSI parameter 224 includes a destination 230 and a vector 240. The destinations 230-1 to 230-N define the ID for interrupt 72 of the CPU 60 which is to receive the interrupt. The vector 240 is a value that the CPU 60 which has received an interrupt passes to the interrupt hander 300 or the physical interrupt reception module 390, upon branch thereto, and is used to identify an I/O device which has generated the interrupt.

The MSI-X parameter list 228 includes a plurality of destinations 230-1 to 230-N and vectors 240-1 to 240-N. The MSI-X provides a feature to deliver an interrupt with different destinations 230 and vectors 240 depending on a reason of an interrupt from the I/O device 170. In order to realize this feature, a plurality of entries are provided in correspondence with interrupt reasons, and the destination 230 and the vector 240 can be set to the each entry.

FIG. 5 is a configuration diagram illustrating a format of the assignment preliminary input table 460 constituting the resource management table 410. The assignment preliminary input table 460 holds a physical I/O device usage form 433 and configuration information of virtual machines 30. As the configuration information of the virtual machine 30, virtual machine numbers 411, operation states 462, assigned memory quantities 463, exclusive CPU counts 464, mutual CPU counts 465, and virtual I/O device allocation presence/absence 466 are held.

The physical I/O device usage form 433 holds, for each physical I/O device 170, a classification indicative of whether the physical I/O device 170 is used in the dedicated form or in the shared form.

The virtual machine number 441 holds a serial number assigned to a virtual machine 30.

The operation state 462 holds information indicating whether the virtual machine 30 is in activated (ACT) state or deactivated (DEACT) state.

The assigned memory quantity 463 holds a quantity of the memory 110 to be assigned to the virtual machine 30.

The exclusive CPU count 464 and the mutual CPU count 465 define counts of the CPUs assigned to the virtual machine 30. The exclusive CPU count 464 holds the count of exclusive CPUs and the mutual CPU count 465 holds the count of mutual CPUs.

The virtual I/O device assignment presence/absence 466 holds the presence/absence of the physical I/O devices 170-1 to 170-n assigned to the virtual machine 30. When the usage form 433 of the physical I/O device 17 is the dedicated form, the physical I/O device 17 can be assigned to only one virtual machine, while when the usage form 433 is the shared form, the physical I/O device 17 can be assigned to an unlimited number of virtual machines. In the illustrated example, when the virtual I/O device assignment presence/absence 466 holds "o", to the corresponding virtual machine, the device shown under the virtual I/O device assignment presence/absence 466 is assigned.

The assignment preliminary input table 460 is mainly used to define the configuration of the virtual machine 30 in the DEACT state, and the set values are not reflected to the virtual machine 30 until the ACT state. Moreover, even when a hot plug feature for dynamically changing the configuration of the virtual machine 30 in the ACT state is used, until the start of the hot plug, the set values are not reflected to the configuration of the virtual machine 30. The information in the assignment preliminary input table 460 is reflected, upon entrance to the ACT state or the hot plug, to the physical CPU management table 420, the physical I/O device management table 430, the virtual CPU management table 440, the virtual I/O device management table 450, and the configuration of the virtual machine 30.

It should be noted that the assignment preliminary input table 460 may be displayed on the console 150 as an assignment interface for inputting setting of the virtual CPUs and the virtual I/O devices.

FIG. 6 is a configuration diagram illustrating a format of the physical CPU management table 420 constituting the resource management table 410. The physical CPU management table 420 includes, in order to hold the usage form of the each physical CPU, physical CPU numbers 421 and physical CPU usage forms 422.

The physical CPU number 421 is a serial number (identifier) assigned to the each physical CPU 60. The physical CPU usage form 422 holds the exclusive state in which the each CPU 60 is assigned in the dedicated form, and the interrupt interception flag is disabled, or the mutual state in which the each CPU 60 is assigned in the mutual form, and the interrupt interception flag is enabled.

FIG. 7 is a configuration diagram illustrating a format of the physical I/O device management table 430 constituting the resource management table 410. The physical I/O device management table 430 includes, in order to hold the usage form and the state of the each physical I/O device, physical I/O device numbers 431, physical I/O device usage forms 433, and initialization flags 434.

The physical I/O device number 431 is a serial number (identifier) assigned to the each physical I/O device.

The physical I/O device usage form 433, as described before, holds the dedicated state or the shared state of the usage of the each physical I/O device 170.

The initialization flag 434 holds an initialized or non-initialized state of the each physical I/O device 170 assigned in the shared state.

FIG. 8 is a configuration diagram illustrating a format of the virtual CPU management table 440 constituting the resource management table 410. The virtual CPU management table 440 includes, in order to hold the usage form of the each virtual CPU 60, virtual machine numbers 441, virtual CPU numbers 442, and physical CPU numbers 421.

The physical CPU number 442 is a serial number (identifier) assigned to the each virtual CPU 600 in the virtual machine.

The physical CPU number 421 holds, only when the CPU 60 in the exclusive form is assigned, holds the serial number of the assigned physical CPU 60. When the CPU 60 in the mutual form is assigned, this field is invalid.

FIG. 9 is a configuration diagram illustrating a format of the virtual I/O device management table 450 constituting the resource management table 410. The virtual I/O device management table 450 includes, in order to hold assignment information and the destination of an interrupt of the each virtual I/O device 1700, virtual machine numbers 441, virtual I/O device numbers 452, and physical I/O device numbers 431.

The virtual I/O device number 452 is a serial number (identifier) assigned to the each virtual I/O device 1700 in the virtual machine 30.

The physical I/O device number 431 holds a number (serial number) of the physical I/O device assigned to the virtual I/O device 1700 in the dedicated form or the shared form.

(3. Interrupt Delivery Process by VMM)

Next, a description is given of an example of an interrupt delivery process carried out by the VMM 20 according to an operation of a guest (guest OS 40 or an application program 50 operating on the guest OS 40) referring to flowcharts.

(3.1. Overview of Interrupt Delivery Process by VMM)

Figure 10A:
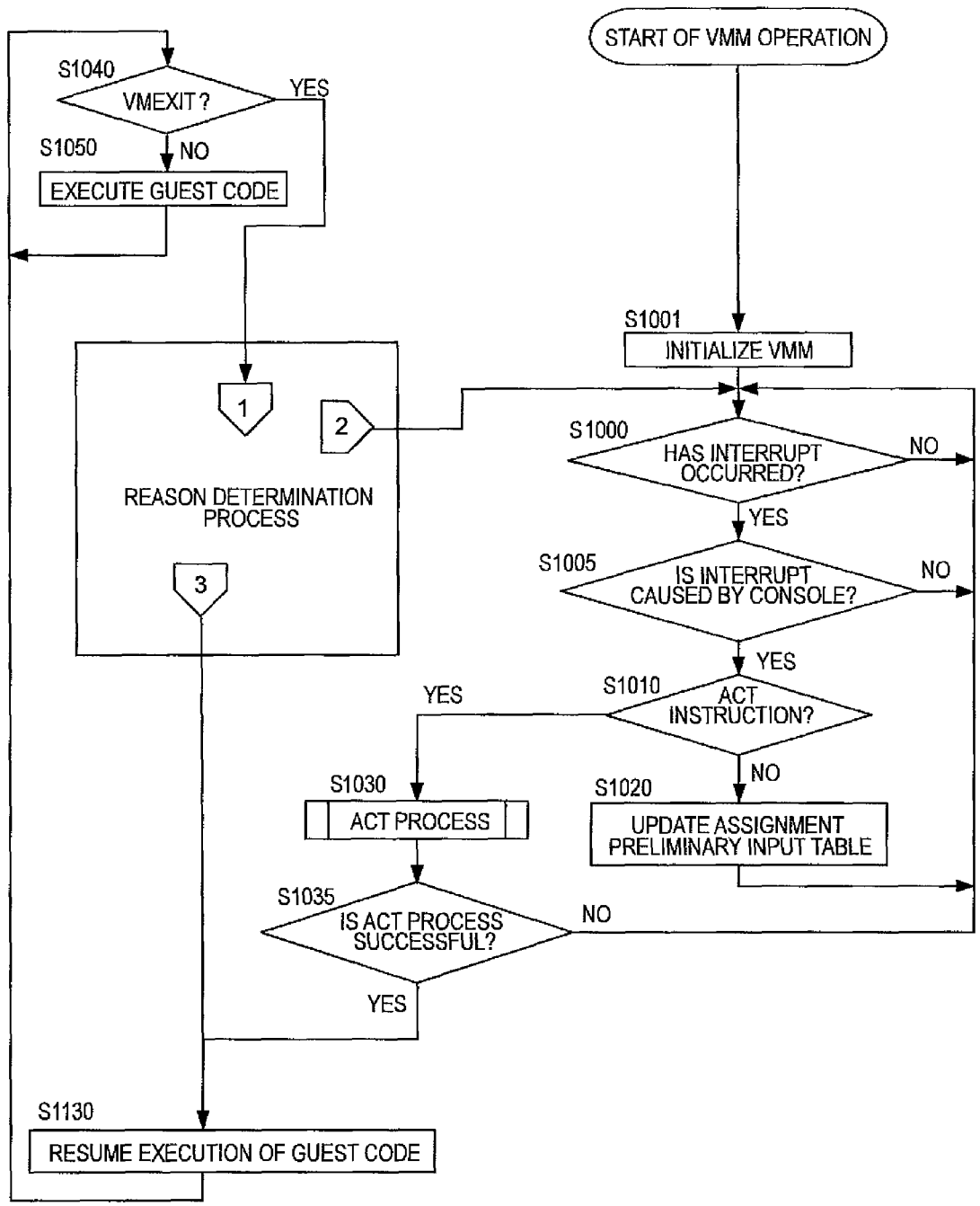
FIG. 10A illustrates the first and second embodiment of this invention, and is an overall process when a guest is executed on the VMM 20.
Figure 10B:
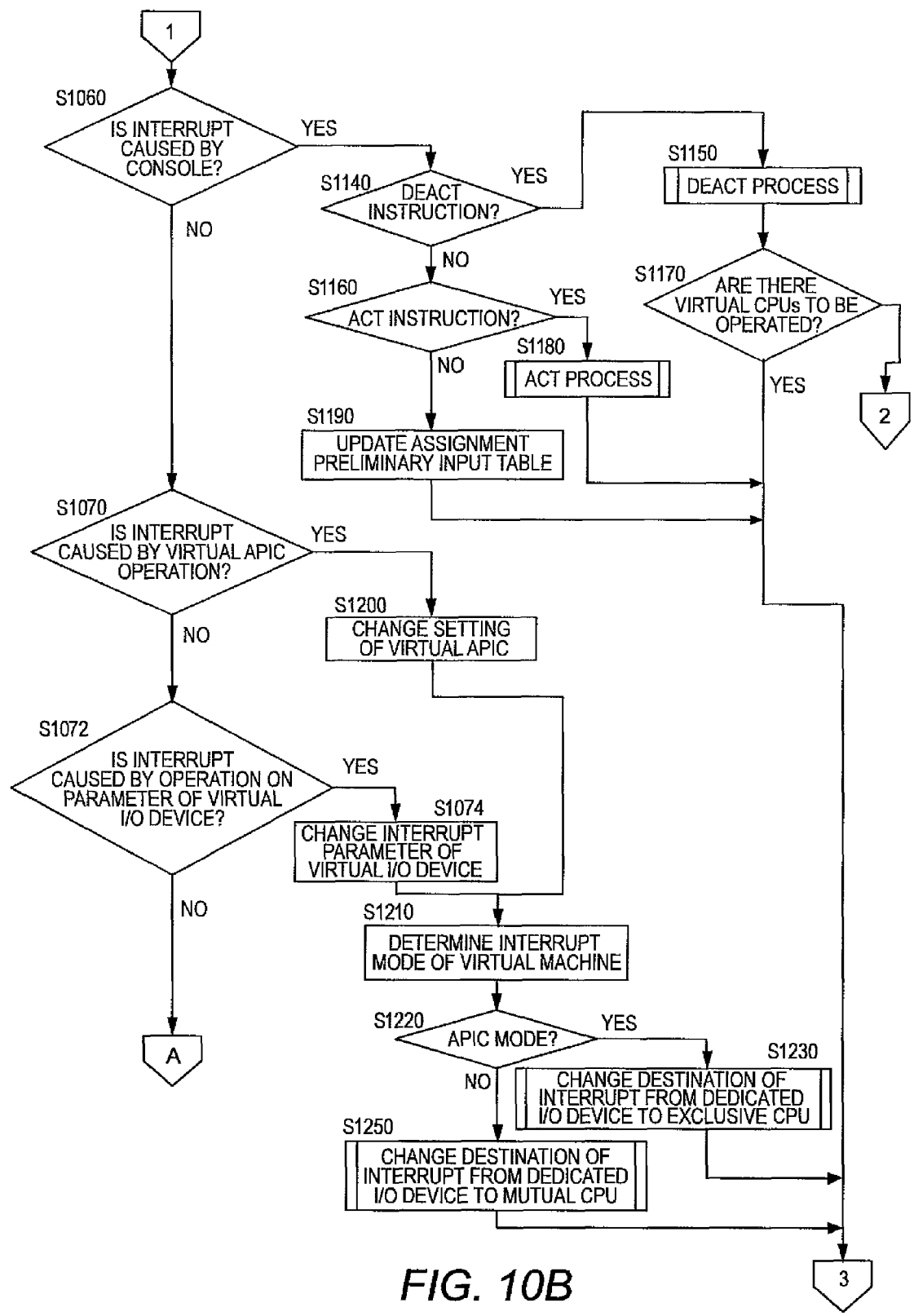
FIG. 10B illustrates the first and second embodiment of this invention, and is a flowchart of a first part illustrating in detail a reason determination process of FIG. 10A.
Figure 10C:
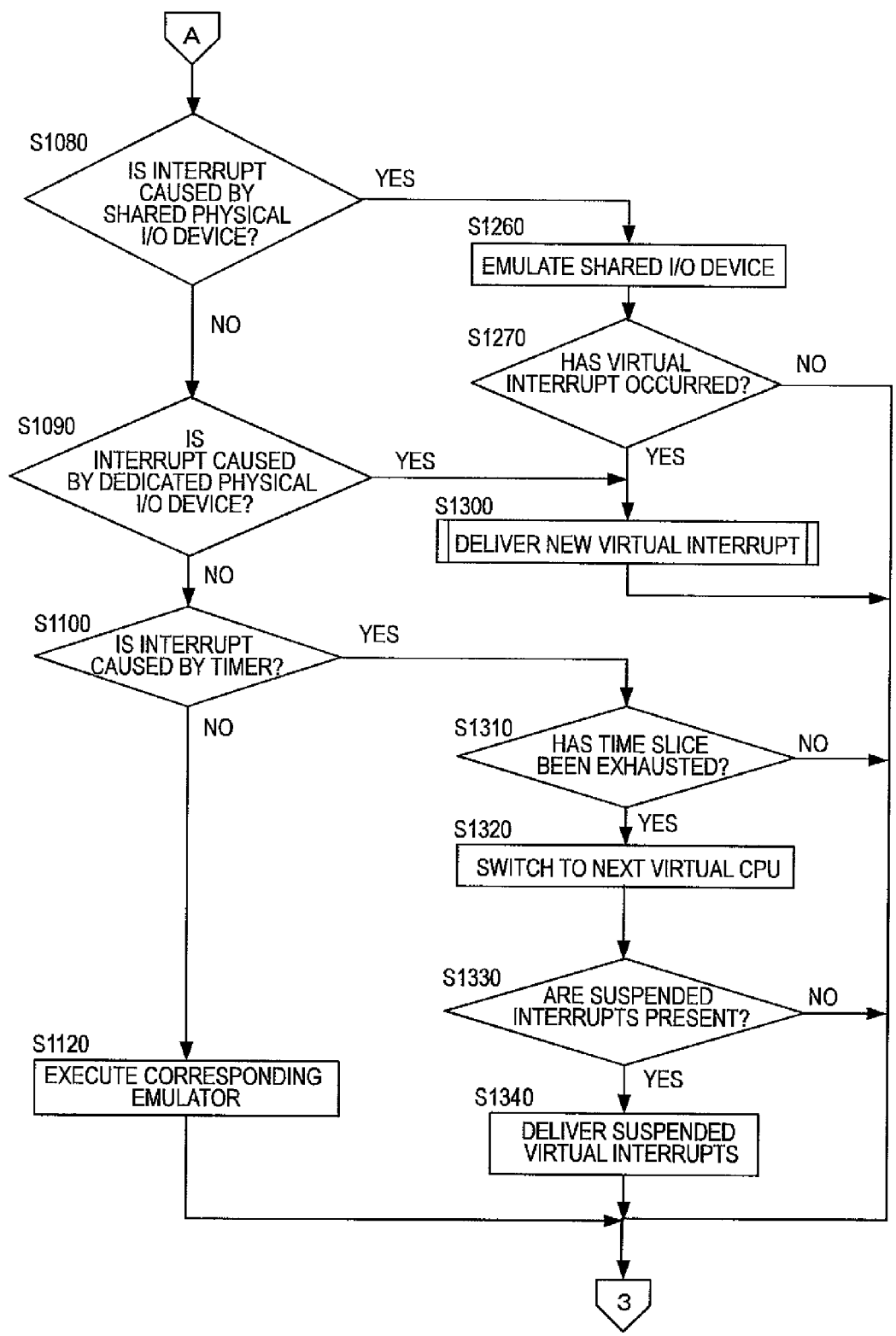
FIG. 10C illustrates the first and second embodiment of this invention, and is a flowchart of a last part illustrating in detail a reason determination process of FIG. 10A.

FIGS. 10A to 10C illustrate flowcharts representing an overall process when a guest is executed on the VMM 20. The flowcharts assume that a plurality of CPUs 60 are used, and the each CPU 60 operates independently according to the flowcharts. It should be noted that FIG. 10A is a flowchart illustrating an overall process, and FIGS. 10B and 10C are flowcharts illustrating in detail a reason determination process of FIG. 10A, in which FIG. 10B illustrates a first part thereof while FIG. 10C illustrates a last part thereof.

In S1001 of FIG. 10A, the VMM 20 recognizes the count of the physical CPUs 60 and the types and the count of the physical I/O devices 170, initializes the data inside the VMM 20, and proceeds to S1000.

In S1000, the VMM 20 waits for an interrupt. When an interrupt has occurred, the VMM 20 proceeds to S1005, and otherwise, the VMM 20 returns to S1000.

In S1005, the VMM 20 determines a reason for the interrupt. When the interrupt is generated from the console 150, the VMM proceeds to S1010. When the interrupt is an interrupt of other type, the VMM 20 returns to S1000.

In S1010, the VMM 20 determines whether a console operation which has caused the interrupt is an ACT instruction. When the console operation is the ACT instruction, the VMM 20 proceeds to S1030, and otherwise, proceeds to S1020.

In S1020, the VMM 20 receives a user input from the console 150, updates data in the assignment preliminary input table 460, displays the data on the console 150, and returns to S1000.

In S1030, the VMM 20 carries out an operation starting process (ACT process) of a virtual machine 30, assigns resources such as CPUs 60 and I/O devices 170 to the virtual machine 30, prepares for execution of the code of the OS 40, and proceeds to S1035.

In S1035, when the ACT process of the virtual machine 30 is successful, the VMM 20 proceeds to S1130, and when the ACT process has failed, the VMM 20 returns to S1000.

In S1130, the VMM 20 uses the VM-entry of the VT-x, the VMRUN instruction of the AMD-V, or the like to branch processing to be carried out by the CPU 60 to the code of the guest (OS 40 or AP 50), and proceeds to S1040.

In S1040, the VMM 20 uses a feature of the VT-x or AMD-V to determine whether an event requiring intervention of the VMM 20 (VM-exit) has occurred. When the VM-exit has occurred on the guest, the VMM 20 proceeds to S1060 of FIG. 10B of the reason determination process, and when the VM-exit has not occurred, the VMM 20 proceeds to S1050. In S1050, the VMM 20 executes one instruction out of instructions in a guest code, and returns to S1040.

When the VM-exit occurs on the guest, the VMM 20 proceeds to the reason determination process (S1060) of FIG. 10B, and, in the reason determination process, the VMM 20 carries out a process corresponding to the reason for occurrence of the VM-exit as described later, and returns to S1000 or S1130.

On this occasion, the CPU 60 provided with the virtualization assistance feature is set to one of the operation mode (VMX non-root mode) for executing the guest (OS 40 or AP 50) and the operation mode (VMX root mode) for executing the VMM 20.

The transition between the VMX root mode and the VMX non-root mode of the VMX mode is carried out as described in "Intel 64 and IA-32 Architectures Software Developer's Manual VOL 3B". Thus, only a brief description is now given thereof. Upon the transition from the normal operation mode to the VMX mode, the VMM 20 issues the VMXON instruction, thereby switching the operation mode of the physical CPU 60 to the VMX mode. Then, the VMM 20 which has switched to the VMX mode issues the VM-entry instruction (VMLAUNCH instruction or VMRESUME instruction), thereby switching the VMX root mode to the VMX non-root mode. This transition from the VMX root mode to the VMX non-root mode is referred to as VM-entry.

Conversely, the transition from the VMX non-root mode to the VMX root mode is referred to as VM-exit. Upon the VM-exit due to a predetermined reason such as an issue of a privileged instruction of the guest, the physical CPU 60 notifies the VMM 20 of the VM-exit. The VMM 20, upon the detection of the VM-exit, carries out predetermined emulation to finish a process for the guest, and then, issues the VM-entry instruction, thereby switching the VMX non-root mode to the VMX root mode.

Referring to FIG. 10B and FIG. 10C, a description is now given of a process upon generation of the VM-exit in S1050 of FIG. 10A.

When the VM-exit occurs on the guest, the VMM 20 carries out a process of S1060 of FIG. 10B. In S1060, the VMM 20 determines whether the reason for the VM-exit is an interrupt from the console 150. If the reason is an interrupt from the console 150, the VMM 20 proceeds to S1140, and otherwise, proceeds to S1070.

In S1140, the VMM 20 determines whether the console operation is a DEACT instruction or not. When the console operation is the DEACT instruction, the VMM 20 proceeds to S1150, and otherwise, proceeds to S1160.

In S1150, the VMM 20 carries out an operation finishing process (DEACT process) of the virtual machine 30, releases the resources such as the CPUs 60 and the I/O devices 170 assigned to the virtual machine 30, and proceeds to S1170.

In S1170, the VMM 20 determines whether there are virtual CPUs 600 to be operated, and when there are virtual CPUs 600 to be operated, the VMM 20 returns to S1130 of FIG. 10A, and resumes the execution of the guest. On the other hand, there are no virtual CPUs 600 to be operated, the VMM 20 returns to S1000 of FIG. 10A, and waits until an interrupt occurs.

In S1160, the VMM 20 determines whether the console operation is an ACT instruction. When the console operation is the ACT instruction, the VMM 20 proceeds to S1180, and otherwise, proceeds to S1190.

In S1190, the VMM 20 receives a user input from the console 150, updates data in the assignment preliminary input table 460, displays the data on the console 150, and returns to S1130.

In S1180, the VMM 20 carries out an operation starting process (ACT process) of a virtual machine 30, assigns resources such as CPUs 60 and I/O devices 170 to the virtual machine 30, prepares for execution of the code of the OS 40, and proceeds to S1130 of FIG. 10A.

In S1070, the VMM 20 determines whether the reason for the VM-exit is an instruction by the OS 40 for changing the setting of the virtual APIC (virtual LAPIC or virtual IOAPIC). When the reason is an instruction for changing the stetting of the virtual APIC, the VMM 20 proceeds to S1200, and otherwise, proceeds to S1072.

In S1200, the VMM 20, according to the instruction from the OS 40, changes setting of the virtual LAPIC register 480 or the virtual IOAPIC register 485, and proceeds to S1210.

In S1210, the VMM 20 determines an interrupt mode of the virtual machine 30. The interrupt mode of the virtual machine 30 means usage of the interrupt controller (PIC or APIC) by the OS 40, and includes the PIC mode in which only the PIC is used, and the APIC mode in which only the APIC is used. In the PIC mode, all interrupts are delivered to a single CPU referred to as boot strap processor (BSP). On the other hand, in the APIC mode, according to necessity, interrupts are distributed to a plurality of CPUs 60. In this step, the VMM 20 determines the interrupt mode of the virtual machine 30 according to the virtual LAPIC register 480 and the virtual IOAPIC register 485, and proceeds to S1220.

In S1220, when the interrupt mode of the virtual machine 30 is the APIC mode, the VMM 20 proceeds to S1230, and when the interrupt mode is the PIC mode, the VMM 20 proceeds to S1250.

In S1230, to a possible extent, for physical I/O devices 170 assigned to the virtual machine 30 in the dedicated form, the destination 230 of the interrupt parameter 220 is set to the ID for interrupt 72 of the CPU 60 assigned in the exclusive form.

In S1250, for all physical I/O devices 170 assigned to the virtual machine 30 in the dedicated form, the destination 230 of the interrupt parameter 220 is set to the ID for interrupt 72 of the CPU 60 assigned in the mutual form.

In S1072, the VMM 20 determines whether the reason for the VM-exit is an instruction by the OS 40 for changing the setting of the interrupt parameter 490 of a virtual I/O device 1700. When the reason is an instruction for changing the stetting of the interrupt parameter 490 of a virtual I/O device 1700, the VMM 20 proceeds to S1074, and otherwise, proceeds to S1080 of FIG. 10C.

In S1074, the VMM 20 changes the interrupt parameter 490 of a virtual I/O device 1700. When the MSI-X of the virtual I/O device 1700 is enabled, the VMM 20 changes the interrupt parameter 220 of a physical I/O device 170, thereby enabling the MSI-X of the physical I/O device 170 as well. Moreover, when the MSI of the virtual I/O device 1700 is enabled, the VMM 20 changes the interrupt parameter 220 of the physical I/O device 170, thereby enabling the MSI of the physical I/O device 170 as well. After the above-mentioned process, the VMM 20 proceeds to S1210.

In S1080 of FIG. 10C, the VMM 20 determines whether the reason for the VM-exit is an interrupt from a physical I/O device 170 assigned in the shared form or not based on the vector 240 and the like. When the reason is the interrupt from a physical I/O device 170 assigned in the shared form, the VMM 20 proceeds to S1260, and otherwise, proceeds to S1090.

In S1260, the VMM 20 executes the I/O emulator 340, returns, to the OS 40, the same response as in the case in which the physical I/O device 170 is assigned to the virtual machine 30 in the dedicated form, and proceeds to S1270.

In S1270, the VMM proceeds to S1300 when, during the execution of the I/O emulator 340, it is necessary to generate a virtual interrupt to the virtual machine 30, and proceeds to S1130 of FIG. 10A when it is not necessary to generate a virtual interrupt.

In S1090, the VMM 20 determines whether the reason for the VM-exit is an interrupt from a physical I/O device 170 assigned in the dedicated form or not based on the vector 240 and the like. When the reason is the interrupt from a physical I/O device 170 assigned in the dedicated form, the VMM 20 proceeds to S1300, and otherwise, proceeds to S1100.

In S1300, responding to the interrupt occurring on the virtual machine 30, the PIC emulator 320 or the APIC emulator 330 is executed, and the virtual interrupt is stored in the virtual PIC register 470 or the virtual LAPIC register 480, or is delivered to the virtual CPU 600 to thereby branch the processing by the virtual CPU 600 to the interrupt handler 300 of the OS 40.

In S1100, the VMM 20 determines whether the reason for the VM-exit is an interrupt from a timer based on the vector 240 and the like. When the reason is the interrupt from a timer, the VMM 20 proceeds to S1310, and otherwise, proceeds to S1120.

In S1110, the VMM 20 determines whether the reason for the VM-exit is an INIT, which is a type of a non-maskable interrupt. When the reason is the INIT interrupt, the VMM 20 proceeds to S1330, and otherwise, proceeds to S1120.

In S1310, the VMM 20 executes the CPU assignment time management module 350, thereby determining whether the virtual CPU 600 has exhausted the CPU time or not. When the virtual CPU 600 has exhausted the assigned time, the VMM 20 proceeds to S1320, and when the virtual CPU 600 has not exhausted the assigned time, the VMM 30 proceeds to S1130.

In S1320, the VMM 20 executes the CPU assignment time management module 350, identifies a virtual CPU 600 to be operated next, switches the operating virtual CPU 600, and proceeds to S1330.

In S1330, the VMM 20 determines whether, with regard to the CPU 600 after the switching, interrupts are stored in the virtual PIC register 470 or the virtual LAPIC register 480, and the delivery thereof are suspended. When the interrupt delivery is suspended, the VMM 20 proceeds to S1340, and, otherwise, proceeds to S1130 of FIG. 10A.

In S1340, the VMM 20 executes the PIC emulator 320 or the APIC emulator 330, thereby determining whether the interrupts whose delivery is suspended include interrupts which can be immediately delivered. When there are interrupts which can be immediately delivered, the VMM 20 removes those interrupts from the virtual PIC register 470 or the LAPIC register 480, and delivers them to the interrupt handler 330 of the OS 40.

In S1120, the VMM 20 executes an emulator 310 corresponding to a reason for the VM-exit other than those described above.

As a result of the process described above, the VMM 20 can execute the I/O emulator 340 without omission for operations and interrupts of the I/O device 170 assigned in the shared form. Moreover, when the virtual machine 30 is constituted by I/O devices 170 assigned in the dedicated form and CPUs 60 assigned in the exclusive form, a fast interrupt delivery without the VM-exit is available, and, for other combinations, interrupts can be delivered without omission.

(3.2. ACT/DEACT Process of Virtual Machine)

Figure 11A:
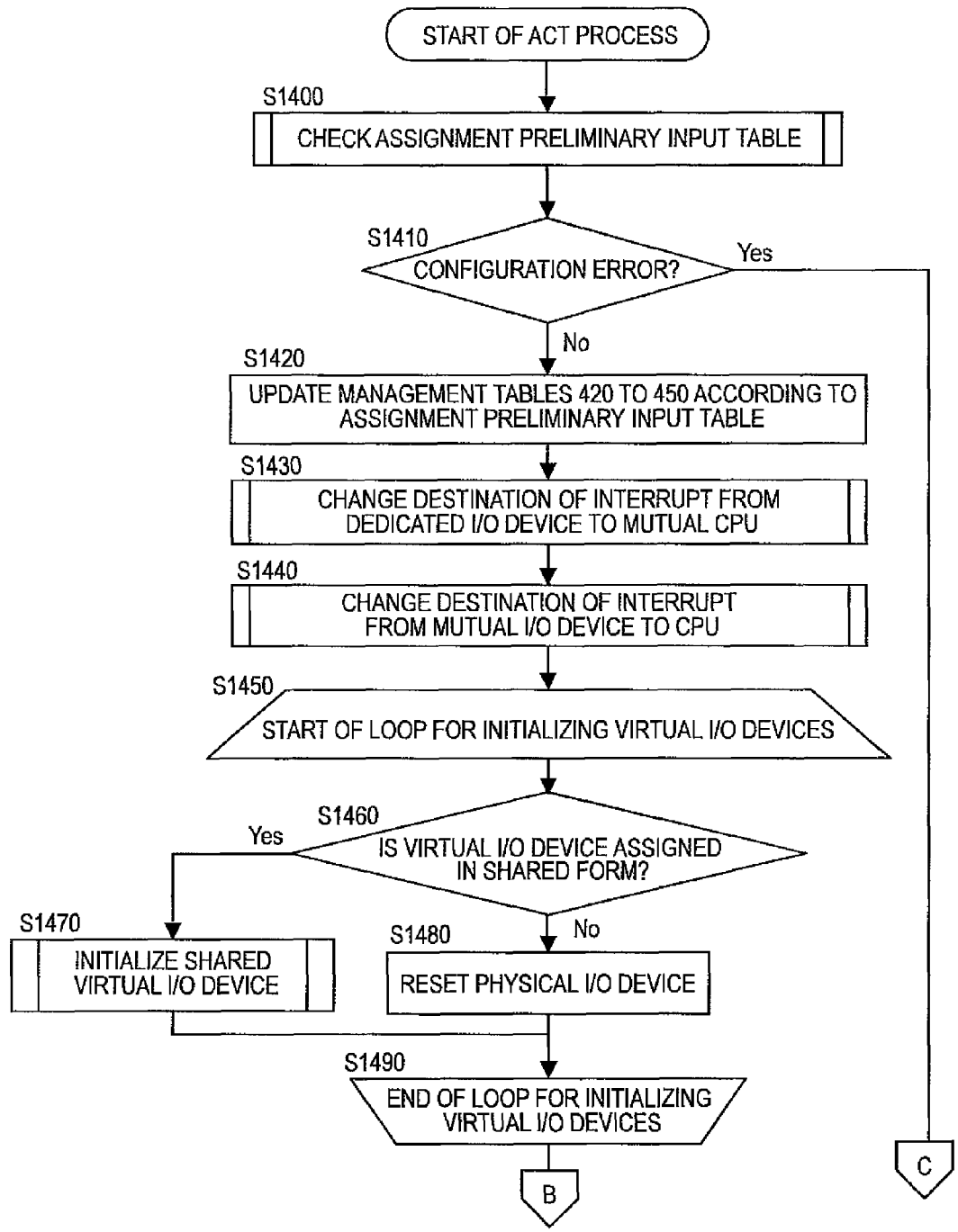
FIG. 11A illustrates the first and second embodiment of this invention, and is a flowchart of a fast part illustrating the ACT (operation start) process of the virtual machine.
Figure 11B:
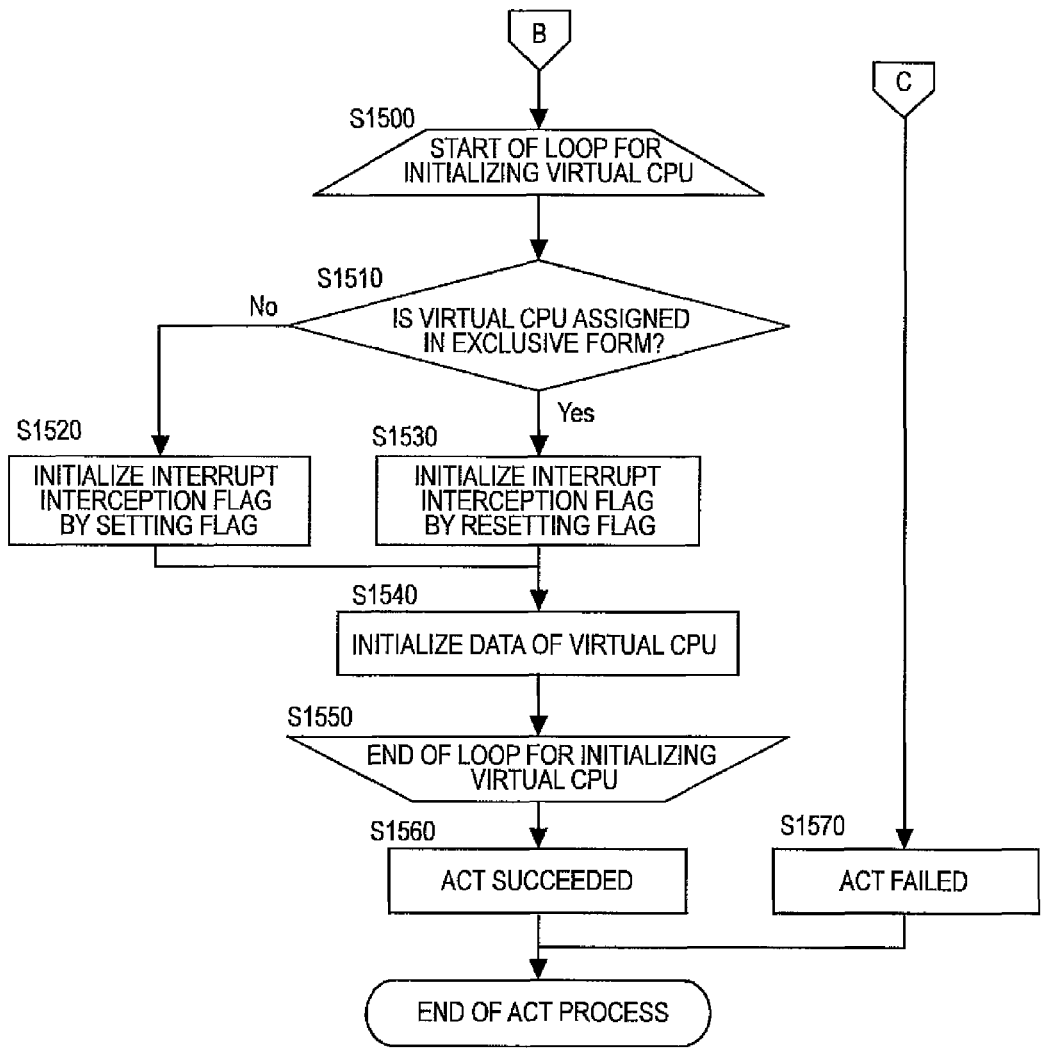
FIG. 11B illustrates the first and second embodiment of this invention, and is a flowchart of a last part illustrating the ACT (operation start) process of the virtual machine.

Referring to FIGS. 11A and 11B, a detailed description is now given of the ACT process carried out by the VMM 20 in S1030 of FIG. 10A and in S1180 of FIG. 10B. FIGS. 11A and 11B are flowcharts illustrating the ACT (operation start) process of the virtual machine, in which FIG. 11A is a first part, and FIG. 11B is a last part.

In S1400 of FIG. 11A, the VMM 20 checks, for the assignment of the virtual CPUs 600 and the virtual I/O devices 1700 constituting the virtual machine 30 to be activated by the VMM 20, the contents of the assignment preliminary input table 460 are valid as described later, and proceeds to S1410.

In S1410, when, as a result of the check in S1400, there is abnormality in configurations specified in the assignment preliminary input table 460, the VMM 20 proceeds to S1570 of FIG. 11B, and, when there is no abnormality, the VMM 20 proceeds to S1420.

In S1420, in order to use assignment information specified in the assignment preliminary input table 460 for an actual assignment, based on an input from the console 150, the VMM 20 updates the physical CPU management table 420, the physical I/O device management table 430, the virtual CPU management table 440, and the virtual I/O device management table 450, and proceeds to S1430.

In S1430, the VMM 20, for all physical I/O devices 170 used in the dedicated form by the virtual machine 30 to be activated, changes the destination 230 of the interrupt parameter 220 to the ID for interrupt 72 of CPUs 60 assigned in the mutual form, and proceeds to S1440. This process is carried out due to a fact that the initial value of the interrupt mode of an x86-compatible machine is the PIC mode. Only a set of two PICs 90 of the north bridge 120 are present on the physical machine 1, which is different from the LAPIC 70 of the CPU 60, and cannot be assigned in the dedicated form. Thus, when the virtual machine 30 is operating in the PIC mode, it is necessary to execute the PIC emulator 320 upon occurrence of an interrupt, and a CPU 60 assigned in the mutual form on which the VMM 20 is executed upon the interrupt receives the interrupt.

In S1440, the VMM 20, for all physical I/O devices 170 used in the shared form in the physical machine 1, changes the destination 230 of the interrupt parameter 220 to the ID for interrupt 72 of CPUs 60 assigned in the mutual form, and proceeds to S1450.

A loop from S1450 to S1490 initializes all the virtual I/O devices 1700 assigned to the virtual machine 30.

In S1460, the VMM 20 determines whether a virtual I/O device 1700 is assigned in the shared form, and when the virtual I/O device 1700 is assigned in the shared form, the VMM 20 proceeds to S1470, and when the virtual I/O device 1700 is assigned in the dedicated form, the VMM 20 proceeds to S1480.

In S1470, the VMM 20 changes various data in the I/O emulator 340 and various registers of a physical I/O device 170 to initial values, initializes the virtual I/O device 1700, and proceeds to S1490.

In S1480, the VMM 20 initializes the virtual interrupt parameter 490 in the I/O emulator 340, resets the physical I/O device 170, initializes the virtual I/O device 1700, and proceeds to S1490. In S1490, when all the virtual I/O devices 1700 have been initialized, the VMM 20 proceeds to S1500 of FIG. 11B.

A loop from S1500 to S1550 initializes all the virtual CPUs 600 assigned to the virtual machine 30.

In S1510, the VMM 20 refers to the virtual CPU management table 440 and the physical CPU management table 420, thereby determining a virtual CPU 600 is assigned in the exclusive form or mutual form. When a physical CPU 60 to which the virtual CPU 600 is assigned is assigned in the exclusive form, the VMM 20 proceeds to S1530, and when the physical CPU 60 is assigned in the mutual form, the VMM 20 proceeds to S1520.

In S1520, the VMM 20 validates (sets) the interrupt interception flag 61 of the virtual CPU 600, and proceeds to S1540. When the CPU 60 in this process is compatible with the VT-x, this process is realized by setting 1 to the External Interrupt Exiting field in the Virtual Machine Control Structure (VMCS). When the CPU 60 is compatible with the AMD-V, this process is realized by setting 1 to the Intercept INTR field in the Virtual Machine Control Block (VMCB).

In S1530, the VMM 20 invalidates (resets) the interrupt interception flag 61 of the virtual CPU 600, and proceeds to S1540. When the CPU 60 in this process is compatible with the VT-x, this process is realized by setting 0 to the External Interrupt Exiting field in the Virtual Machine Control Structure (VMCS). When the CPU 60 is compatible with the AMD-V, this process is realized by setting 0 to the Intercept INTR field in the Virtual Machine Control Block (VMCB).

In S1540, the VMM 20 initializes a data structure such as registers provided for the virtual CPU 600, and proceeds to S1550.

In S1560, in order to show the successful ACT process, the VMM 20 changes the operation state 462 in an entry with a corresponding virtual machine number 441 to "ACT" in the assignment preliminary input table 460. Moreover, the VMM 20 executes the CPU time assignment management module 350 to cause the virtual CPU 600 assigned to the virtual machine 30 to be activated to use the CPU time. In other words, after the processing of S1560, the VMM 20 proceeds from the process illustrated in FIG. 11B to the processing of S1130 of FIG. 10A, thereby starting execution of a guest on the assigned virtual CPU 600.

On the other hand, in S1570, in order to show a failed ACT process, the VMM 20 keeps the operation state 462 to "DEACT" in the assignment preliminary input table 460. After this processing, the VMM 20 proceeds from the process illustrated in FIG. 11B to the processing of S1130 of FIG. 10A, and resumes the execution of a guest which had been carried out before the reception of the interrupt from the console 150.

As a result of the ACT process illustrated in FIGS. 11A and 11B, when an interrupt is generated by an activation instruction of a virtual machine 30 from the console 150, the VMM 20 activates the specified virtual machine 30, and transitions to execution of a guest.

Figure 16:
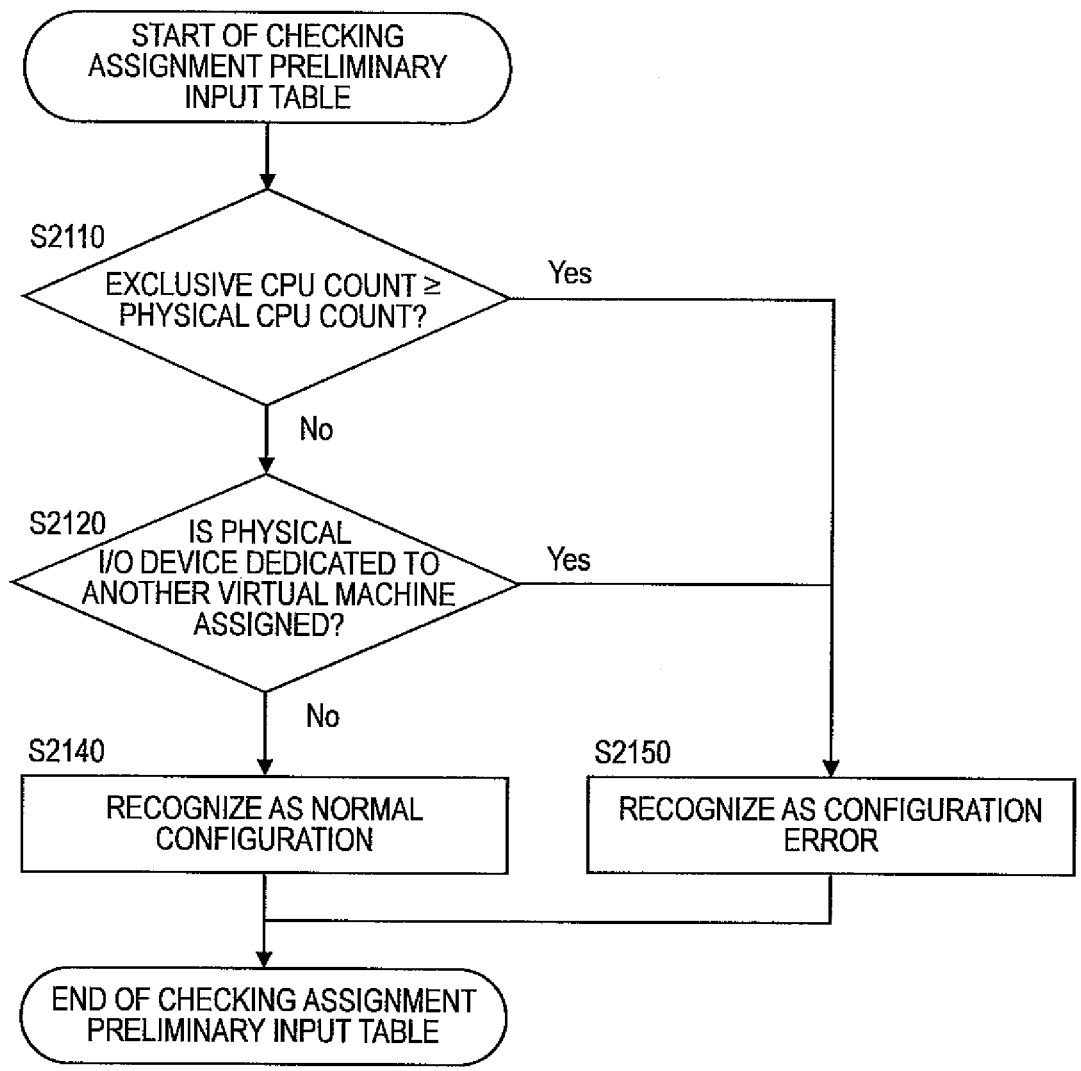
FIG. 16 illustrates the first and second embodiment of this invention, and is a flowchart illustrating the process of checking validity of the assignment preliminary input table.

Referring to FIG. 16, a description is now given of the process for checking the assignment preliminary input table carried out in S1400 of FIG. 11A. FIG. 16 is a flowchart illustrating the process of checking validity of the assignment preliminary input table.

In S2110 of FIG. 16, the VMM 20 determines whether, for virtual machines 30 which have been activated or are under activation, the total of the exclusive CPU counts 464 is less than the total count of the physical CPUs 60 in the assignment preliminary table 460. When the total of the exclusive CPU counts 464 is less than the total of the physical CPUs 60, the VMM proceeds to S2120, and when the total of the exclusive CPU is equal to or more than the total of the physical CPUs 60, the VMM proceeds to S2150. According to this embodiment, in order to handle I/O device assigned in the shared form, at least one CPU 60 assigned in the mutual form is necessary, and the assignment is restricted so that the total of the exclusive CPU counts 464 is less than total of the physical CPUs 60.

In S2120, the VMM 20 refers to the virtual I/O device assignment presence/absence 466 and the physical I/O device usage form 433 in the assignment preliminary input table 460, thereby determining whether a physical I/O device 170 assigned in the dedicated form to other virtual machine 30 is redundantly assigned. When there is a redundant assignment, the VMM 20 proceeds to S2150, and, otherwise, proceeds to S2140.

In S2140, the VMM 20 determines that the configuration of the virtual machine 30 is normal.

In S2150, the VMM 20 determines that the configuration of the virtual machine 30 is abnormal.

As a result of the above-mentioned process, whether the counts of the virtual CPUs 300 and the virtual I/O devices 1700 respectively assigned to the physical CPUs 60 and the physical I/O devices 170 are normal is determined. For example, when all the physical CPUs 60 are assigned in the exclusive form, the VMM 20 determines that the configuration of the virtual machine 30 is abnormal, and notifies the console 150 of the occurrence of the abnormality. It should be noted that the notification of this abnormality may be output to an assigned interface of the console 150.

Figure 17:
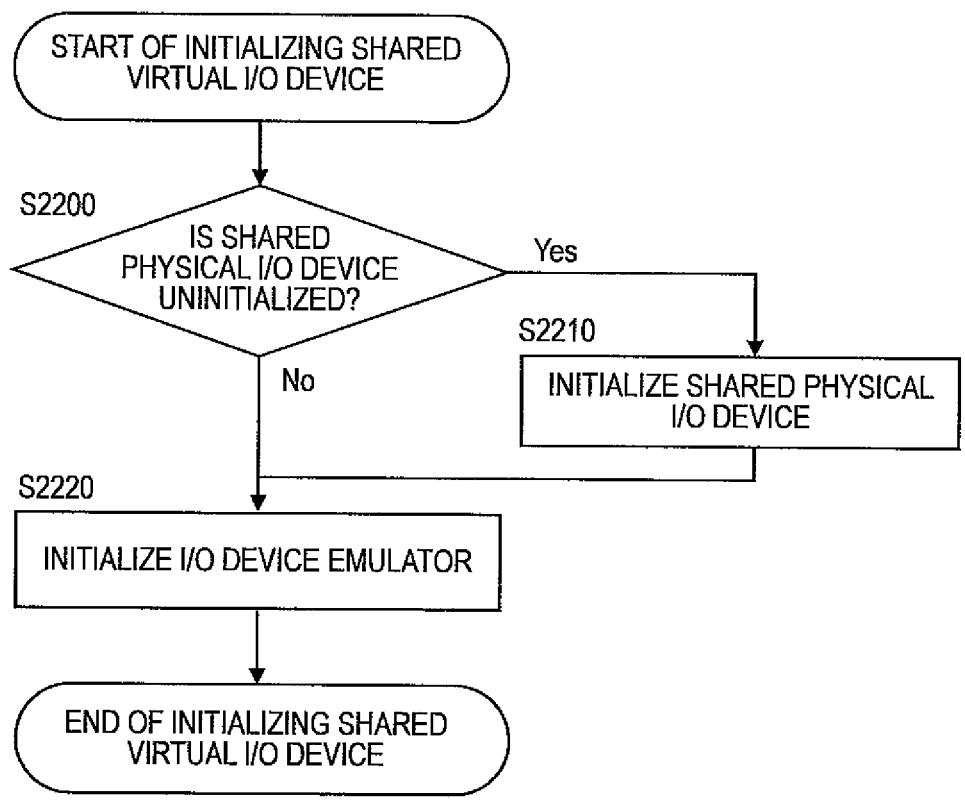
FIG. 17 illustrates the first and second embodiment of this invention, and is a flowchart illustrating the initialization process of the I/O device 1700.

Referring to FIG. 17, a description is now given of the initialization process of the virtual I/O device 1700 carried out by the VMM 20 in S1470 of FIG. 11A. FIG. 17 is a flowchart illustrating the initialization process of the I/O device 1700.

In S2200, the VMM 20 refers to the initialization flag 434 in the physical I/O device management table 430, and when a physical I/O device assigned in the shared form to the virtual I/O device 1700 has not been initialized, proceeds to S2210, and when the physical I/O device has been initialized, proceeds to S2220.

In S2210, the VMM resets and initializes the physical I/O device (physical I/O device 170) assigned in the shared form to the virtual I/O device 1700.

In S2220, the VMM 20 initializes a data structure relating to the virtual I/O device 1700 in the I/O device emulator 340, thereby matching the data structure to a state immediately after the reset of the physical I/O device 170.

Figure 12:
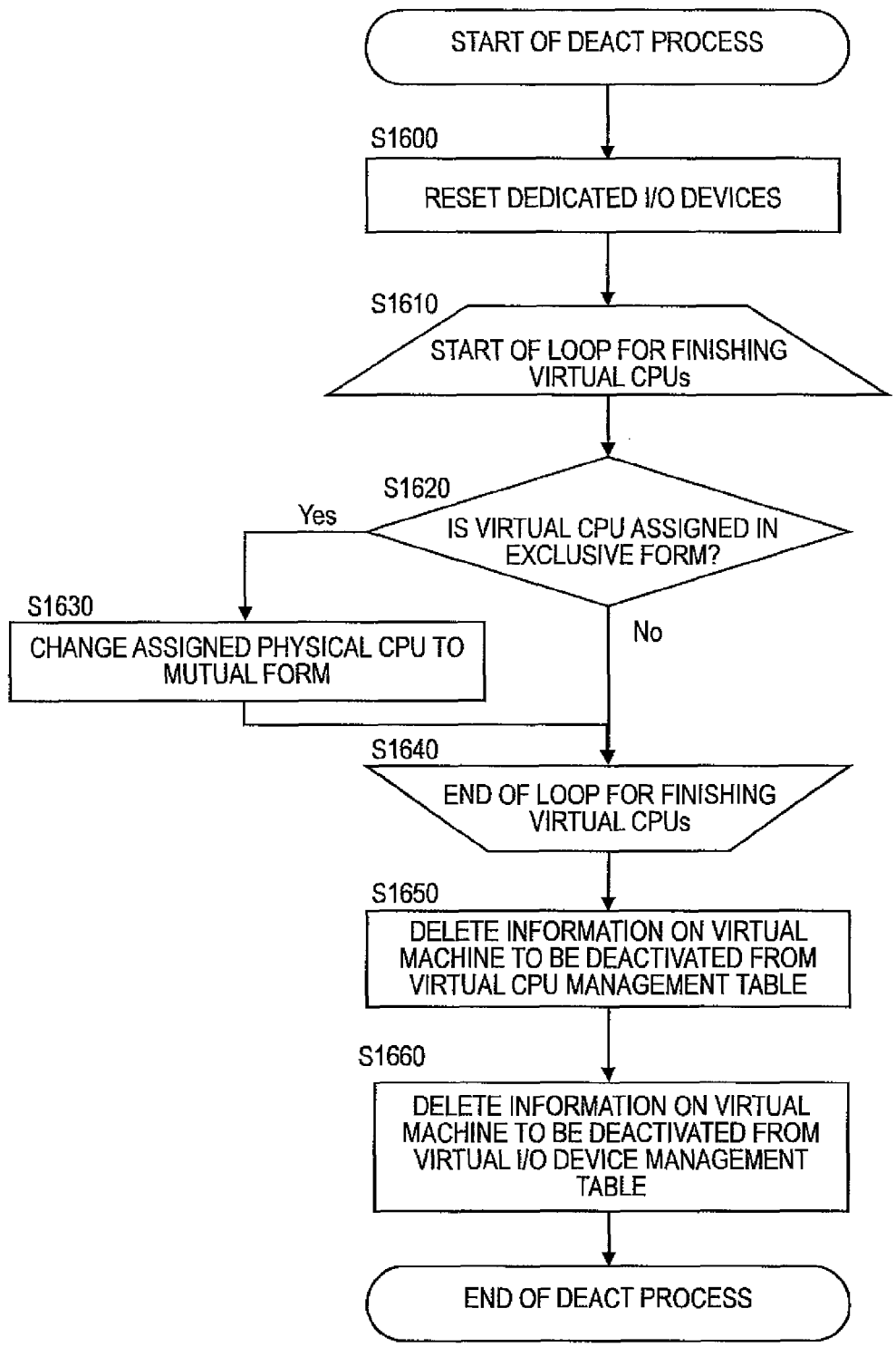
FIG. 12 illustrates the first and second embodiment of this invention, and is a flowchart illustrating the DEACT (deactivation) process of the virtual machine.

Referring to FIG. 12, a description is now given of the DEACT process carried out by the VMM 20 in S1150 of FIG. 10B. FIG. 12 is a flowchart illustrating the DEACT (deactivation) process of the virtual machine.

In S1600, the VMM 20 resets all the physical I/O devices 170 assigned in the dedicated form to the virtual machine 30 to be deactivated by the VMM 20, and proceeds to S1610.

In a loop from S1610 to S1640, the VMM 20 carries out the finishing process for all virtual CPUs 600 assigned to the virtual machine 30 to be deactivated.

In S1620, the VMM 20 determines whether the virtual CPU 600 is assigned in the exclusive form or the mutual form. When the virtual CPU 600 is assigned in the exclusive form, the VMM 20 proceeds to S1630, and when the virtual CPU 600 is assigned in the mutual form, the VMM 20 proceeds to S1640.

In S1630, the VMM 20 updates the physical CPU management table 420, and changes the physical CPU usage form 422 of the CPU 60 assigned in the exclusive form to the mutual form.

In S1650, the VMM 20 clears all the assignment information of the virtual machine 30 to be deactivated in the virtual CPU management table 440, and proceeds to S1660.

In S1660, the VMM 20 clears all the assignment information of the virtual machine 30 to be deactivated in the virtual I/O device management table 450.

As a result of the above-mentioned process, the virtual machine 30 specified from the console 150 is deactivated, and the physical. CPUs 60 and the I/O devices 170 are released.

In the ACT process and the DEACT process, the VMM 20 may be adapted to hot plug of the virtual CPU 600 and the virtual I/O device 1700. When the VMM 20 is adapted to the hot plug, the VMM 20 receives assignments of the CPUs 60 and the I/O devices 170 after the hot plug relating to the virtual machine 30 from a user. For hot add in which the CPUs 60 and the I/O devices 170 increase, the VMM 20 carries out a part of the ACT process, thereby initializing the virtual CPU 600, the virtual I/O device 1700, and corresponding physical CPU 60 and I/O device 170 similarly to the ACT process. On the other hand, for hot remove in which the CPUs 60 and the I/O devices 170 decrease, the VMM 20 carries out a part of the DEACT process, thereby carrying out the finishing process for the virtual CPU 600, the virtual I/O device 1700, and corresponding physical CPU 60 and I/O device 170.

(3.3. Process of Changing Destination of Interrupt from Physical I/O Device)

Figure 13:
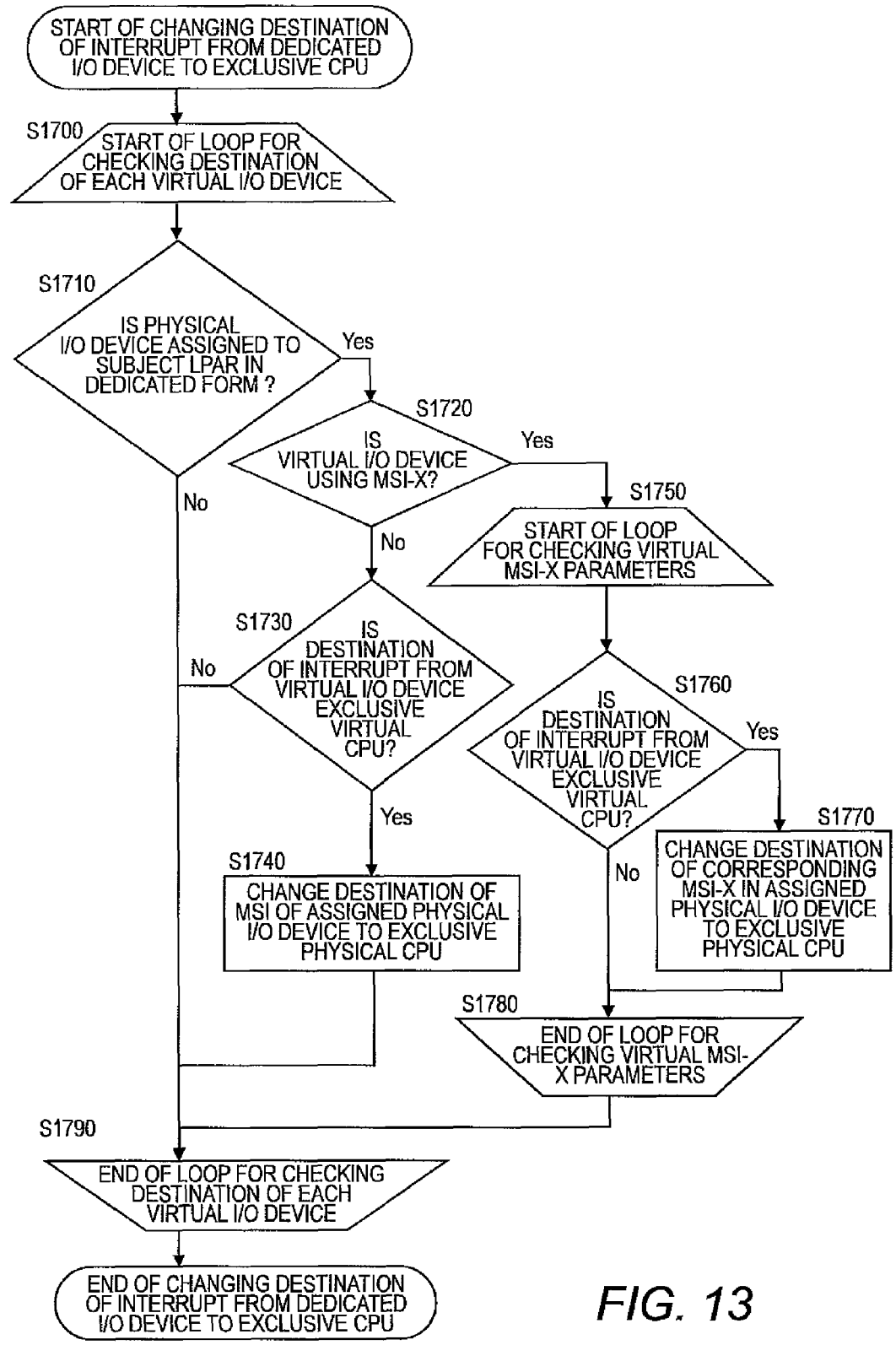
FIG. 13 illustrates the first and second embodiment of this invention, and is a flowchart illustrating a process of changing a destination of an interrupt from an I/O device assigned in the dedicated form to a CPU assigned in the exclusive form.

Referring to FIG. 13, a description is now given of the process of changing the destination of an interrupt from a physical I/O device 170 assigned in the dedicated form to a CPU 60 assigned in the exclusive form, which is carried out in S1230 of FIG. 10B. FIG. 13 is a flowchart illustrating a process of changing a destination of an interrupt from an I/O device assigned in the dedicated form to a CPU assigned in the exclusive form.

In the loop from S1700 to S1790, the VMM 20 reads the setting of all the virtual I/O devices 1700 assigned to the virtual machine 30, and changes the interrupt parameter 220 of the physical I/O device 170 according to necessity.

In S1710, the VMM 20, by using the virtual I/O device management table 450 and the physical I/O device management table 430, determines whether a virtual I/O device 1700 is assigned to the subject virtual machine 30 in the dedicated form. When the virtual I/O device 1700 is assigned in the dedicated form, the VMM 20 proceeds to S1720, and, otherwise, proceeds to S1790.

In S1720, the VMM 20 refers to the interrupt parameter 490 of the virtual I/O device 1700, thereby determining whether the virtual I/O device 1700 has enabled the MSI-X. As a result of the determination, when the MSI-X is enabled, the VMM 20 proceeds to S1750, and when the MSI-X is disabled, the VMM 20 proceeds to S1730.

In S1730, the VMM 20, by using the destination 230 of the interrupt parameter 490 of the virtual I/O device 1700, the ID for interrupt 72 of the virtual LAPIC register 480, and the virtual CPU management table 440, determines whether the virtual CPU 600 to receive an interrupt from the virtual I/O device 1700 is a CPU assigned in the exclusive form. When the virtual CPU 600 to receive an interrupt is a CPU assigned in the exclusive form, the VMM 20 proceeds to S1740, and when the virtual CPU 600 is a CPU assigned in the mutual form, the VMM 20 proceeds to S1790.

In S1740, the VMM 20 changes the destination 230 of the MSI parameter 224 contained in the interrupt parameter 220 of the physical I/O device 170 assigned to the virtual I/O device 1700 to the ID for interrupt 72 of a CPU assigned in the exclusive form to the virtual CPU 600 to receive an interrupt. Moreover, the VMM 20 makes the vector 240 of the same MSI parameter 224 coincide with the vector 240 specified in the interrupt parameter 490 of the virtual I/O device 1700 by the OS 40.

In the loop from S1750 to S1780, the VMM 20, for the MSI-X parameter list 228 of the physical I/O device 170, checks setting and makes changes.

In S1760, the VMM 20, by using the destination 230 specified in the MSI-X parameter contained in the interrupt parameter 490 of the virtual I/O device 1700, the ID for interrupt 72 of the virtual LAPIC register 480, and the virtual CPU management table 440, determines whether the virtual CPU 600 to receive an interrupt from the virtual I/O device 1700 is a CPU assigned in the exclusive form. When the virtual CPU 600 to receive an interrupt is a CPU assigned in the exclusive form, the VMM 20 proceeds to S1770, and when the virtual CPU 600 is a CPU assigned in the mutual form, the VMM 20 proceeds to S1780.

In S1770, the VMM 20 changes the destination 230 of the MSI-X parameter list 228 contained in the interrupt parameter 220 of the physical I/O device 170 assigned to the virtual I/O device 1700 to the ID for interrupt 72 of a physical CPU 60 assigned in the exclusive form to the virtual CPU 600 to receive an interrupt. Moreover, the VMM 20 makes the vector 240 of the same MSI-X parameter list 228 coincide with the vector 240 specified in the interrupt parameter 490 of the virtual I/O device 1700 by the OS 40.

The above-mentioned process can change a destination of an interrupt from a physical I/O device 170 assigned in the dedicated form to a CPU 60 assigned in the exclusive form.

Figure 14:
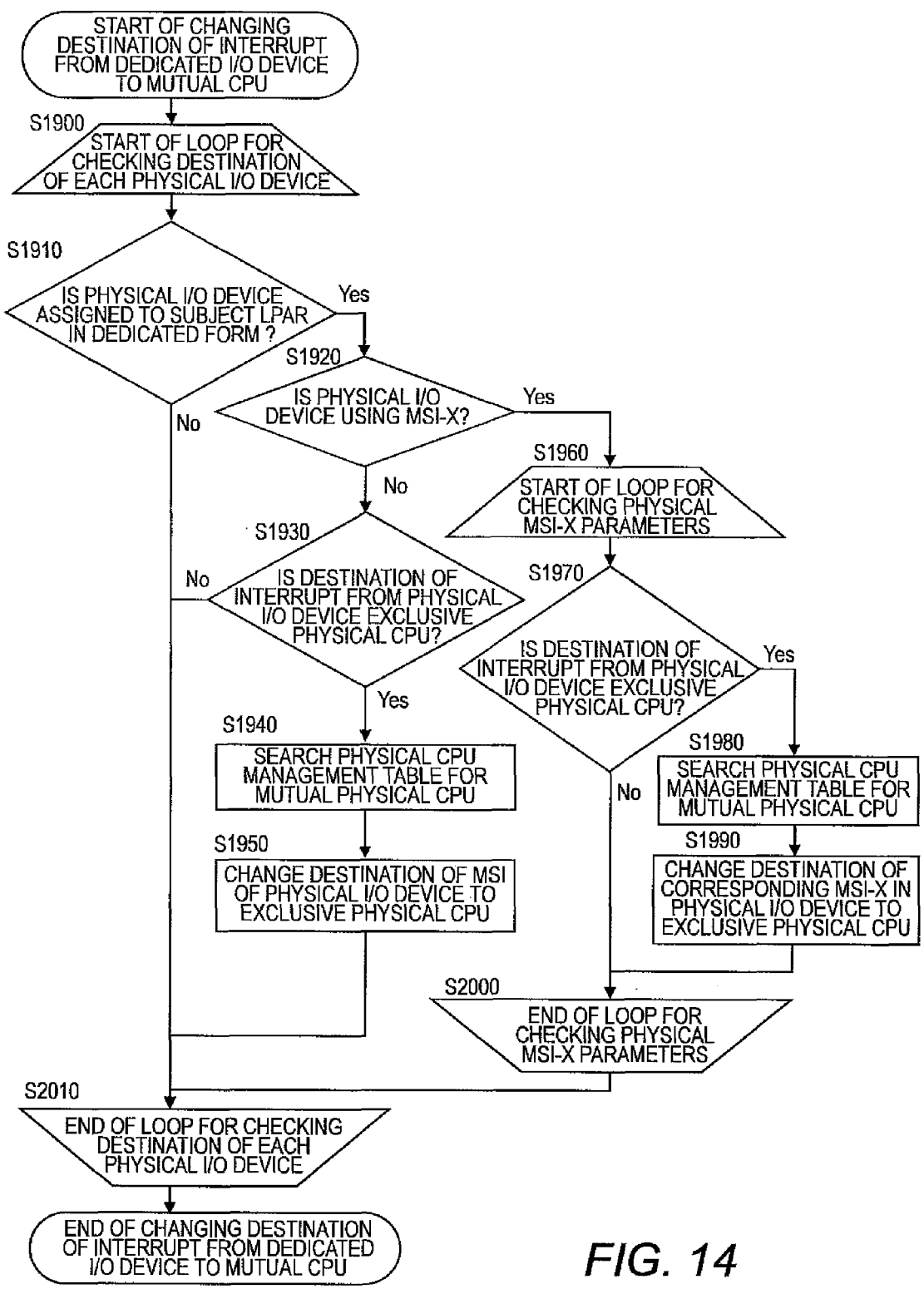
FIG. 14 illustrates the first and second embodiment of this invention, and is a flowchart illustrating a process of changing a destination of an interrupt from an I/O device assigned in the dedicated form to a CPU assigned in the mutual form.

Referring to FIG. 14, a description is now given of the process of changing the destination of an interrupt from a physical I/O device 170 assigned in the dedicated form to a CPU 60 assigned in the mutual form, which is carried out in S1430 of FIG. 11A. FIG. 14 is a flowchart illustrating a process of changing a destination of an interrupt from an I/O device assigned in the dedicated form to a CPU assigned in the mutual form.

In the loop from S1900 to S2010, the VMM 20 reads the setting of all the virtual I/O devices 1700 assigned to the virtual machine 30, and changes the interrupt parameter 220 of the physical I/O device 170 according to necessity.

In S1910, the VMM 20, by referring to the virtual I/O device management table 450 and the physical I/O device management table 430, determines whether the virtual I/O device 1700 is assigned to the subject virtual machine 30 in the dedicated form. When the virtual I/O device 1700 is assigned in the dedicated form, the VMM 20 proceeds to S1920, and, otherwise, proceeds to S2010.

In S1920, the VMM 20 refers to the interrupt parameter 220 of the physical I/O device 170, thereby checking whether the physical I/O device 170 has enabled the MSI-X. When the MSI-X is enabled, the VMM 20 proceeds to S1960, and when the MSI-X is disabled, the VMM 20 proceeds to S1930.

In S1930, the VMM 20, by using the destination 230 of the interrupt parameter 220 of the physical I/O device 170, the ID for interrupt 72 of the physical LAPIC 70, and the physical CPU management table 420, determines whether the physical CPU 60 to receive an interrupt from the physical I/O device 170 is a CPU 60 assigned in the exclusive form. When the physical CPU 60 to receive an interrupt is a CPU assigned in the exclusive form, the VMM 20 proceeds to S1940, and when the physical CPU 60 is a CPU assigned in the mutual form, the VMM 20 proceeds to S2010.

In S1940, the VMM 20 selects, from the physical CPU management table 420, one physical CPU 60 assigned in the mutual form, and proceeds to S1950. According to this embodiment, the configuration in which the count of CPUs 60 assigned in the mutual form is 0 is prohibited, and thus, a physical CPU 60 assigned in the mutual form is always found.

In S1950, the VMM 20 changes the destination 230 of the MSI parameter 224 contained in the interrupt parameter 220 of the physical I/O device 170 to the ID for interrupt 72 of the CPU 60 assigned in the mutual form selected in S1940. Moreover, the VMM 20 changes the vector 240 of the same MSI parameter 224 to a vector used for identifying an interrupt by the VMM 20.

In the loop from S1960 to S2000, the VMM 20, for the MSI-X parameter list 228 of the physical I/O device 170, checks setting and makes changes.

In S1970, the VMM 20, by referring to the destination 230 specified in the MSI-X parameter list 228 contained in the interrupt parameter 220 of the physical I/O device 170, the ID for interrupt 72 of the physical LAPIC 70, and the physical CPU management table 420, determines whether a physical CPU 60 to receive an interrupt from the physical I/O device 170 is a CPU assigned in the exclusive form. When the physical CPU 60 to receive an interrupt is a CPU assigned in the exclusive form, the VMM 20 proceeds to S1980, and when the physical CPU 60 is a CPU assigned in the mutual form, the VMM 20 proceeds to S2000.

In S1980, the VMM 20 selects, from the physical CPU management table 420, one physical CPU 60 assigned in the mutual form, and proceeds to S1990. According to this embodiment, the configuration in which the count of CPUs 60 assigned in the mutual form is 0 is prohibited, and thus, a physical CPU 60 assigned in the mutual form is always found.

In S1990, the VMM 20 changes the destination 230 of the MSI-X parameter list 228 contained in the interrupt parameter 220 of the physical I/O device 170 to the ID for interrupt 72 of the CPU 60 assigned in the mutual form selected in S1980. Moreover, the VMM 20 changes the vector 240 of the same MSI-X parameter list 228 to a vector used for identifying an interrupt by the VMM 20.

The above-mentioned process can change a destination of an interrupt from a physical I/O device 170 assigned in the dedicated form to a CPU 60 assigned in the mutual form.

Figure 15:
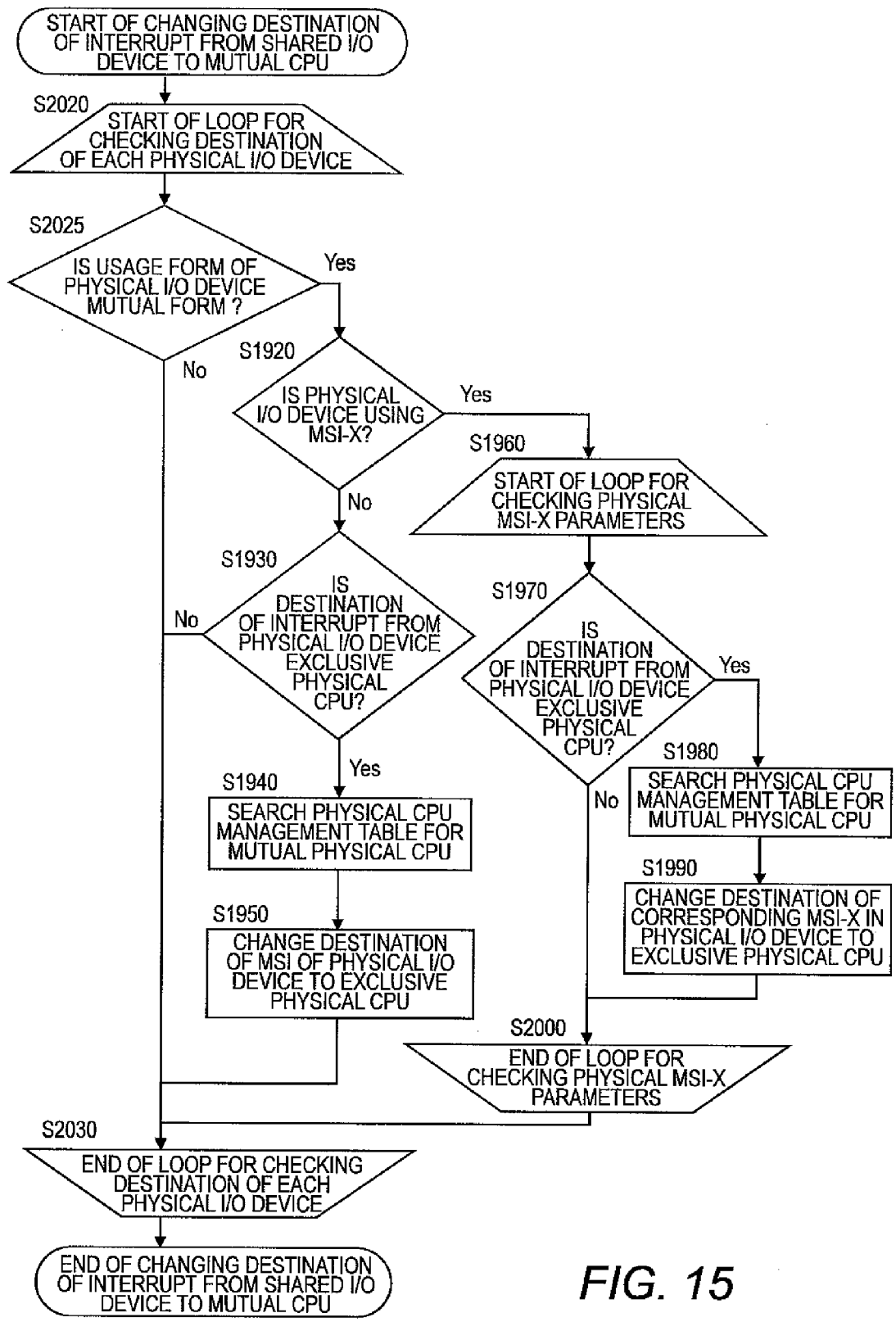
FIG. 15 illustrates the first and second embodiment of this invention, and is a flowchart illustrating a process of changing a destination of an interrupt from an I/O device assigned in the shared form to a CPU assigned in the mutual form.

Referring to FIG. 15, a description is now given of the process of changing the destination of an interrupt from a physical I/O device 170 assigned in the shared form to a CPU 60 assigned in the mutual form, which is carried out in S1440 of FIG. 11A. FIG. 15 is a flowchart illustrating a process of changing a destination of an interrupt from an I/O device assigned in the shared form to a CPU assigned in the mutual form.

In the loop from S2020 to S2030, the VMM 20 checks settings for all the physical I/O devices 170 in the physical machine 1, and changes the interrupt parameter 220 depending on necessity.

In S2025, the VMM 20, by referring to the physical I/O device management table 430, determines whether a physical I/O device 170 is used while it is assigned in the shared form. When the physical I/O device 170 is used while it is assigned in the shared form, the VMM 20 proceeds to S1920, and, otherwise, proceeds to S2030.

Processing from S1920 to S2000 is the same as the processing of the steps with the same reference numerals in FIG. 14, in which the MSI parameter 224 or the MSI-X parameter list 228 contained in the interrupt parameter 220 of the physical I/O device 170 is updated, and hence a description thereof is omitted.

The above-mentioned process can change a destination of an interrupt from a physical I/O device 170 assigned in the shared form to a CPU 60 assigned in the mutual form.

(3.4. Delivery Process for New Virtual Interrupt)

Figure 18:
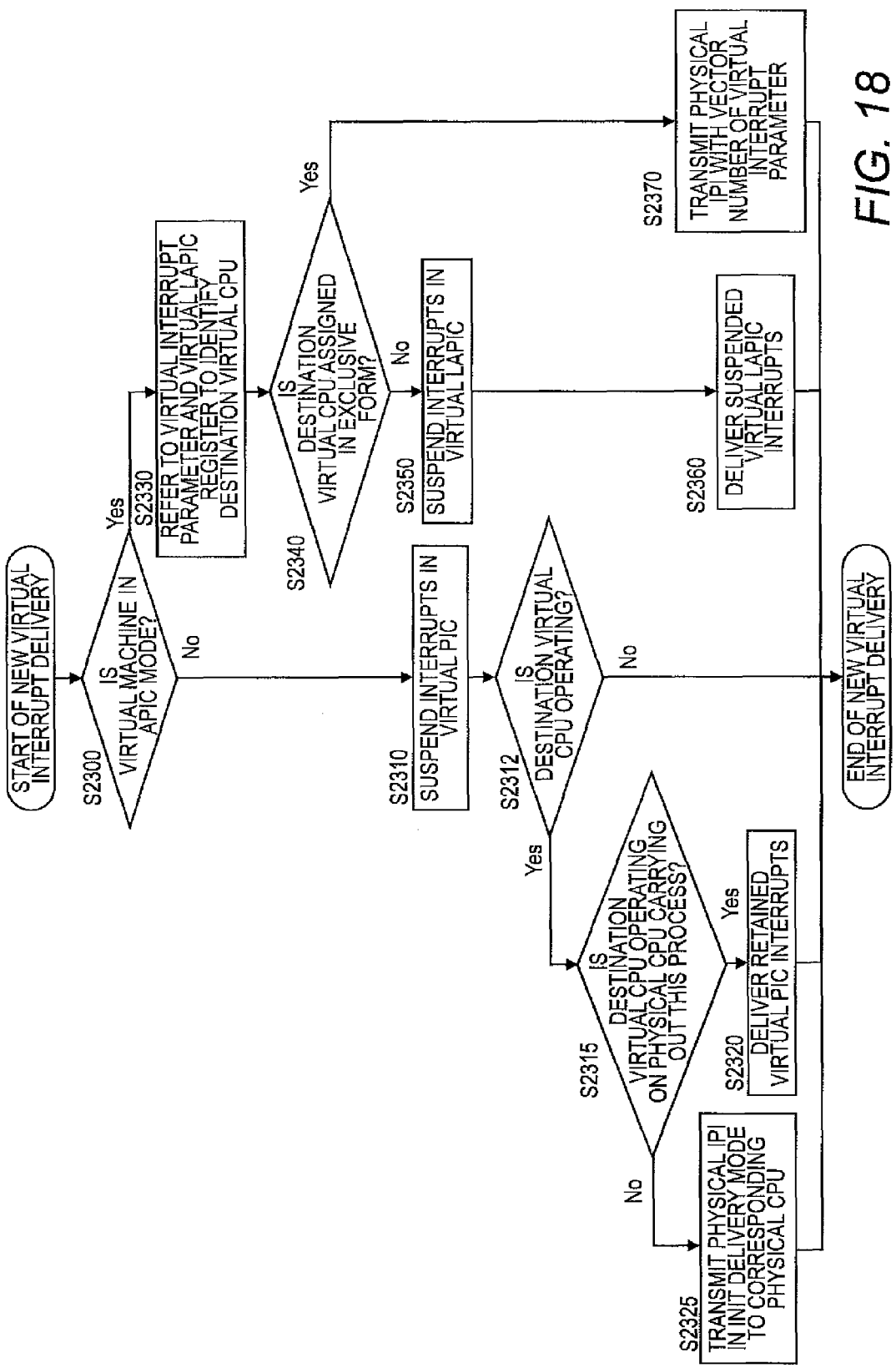
FIG. 18 illustrates the first and second embodiment of this invention, and is a flowchart illustrating the handling process upon generation of a virtual interrupt.

Referring to FIG. 18, a description is now given of the delivery process for a new virtual interrupt carried out by the VMM 20 in S1300 of FIG. 10C. FIG. 18 is a flowchart illustrating the handling process upon generation of a virtual interrupt.

In S2300, the VMM 20 determines the interrupt mode of the virtual machine 30 according to the virtual LAPIC register 480 and the virtual IOAPIC register 485. When the interrupt mode is the APIC mode, the VMM 20 proceeds to S2330, and when the interrupt mode is the PIC mode, the VMM 20 proceeds to S2310.

In S2310, the VMM 20 stores the received interrupt in the virtual PIC register 470 for suspending the interrupt, and proceeds to S2312.

In S2312, the VMM 20 determines whether a virtual CPU 600 which is the destination of the interrupt in the PIC mode is operating. Through this determination, it is determined whether a virtual BSP corresponding to the virtual CPU 600, which is the destination, is currently in operation. When the virtual BSP is operating, the VMM 20 proceeds to S2315, and when the virtual BSP is waiting for an assignment of the CPU time, the VMM 20 finishes the delivery process for a new virtual interrupt.

In S2315, the VMM 20 determines whether a virtual BSP corresponding to the virtual CPU 600 is operating on a physical CPU 60 executing this process. When the virtual BSP is operating on the physical CPU 60 executing this process (virtual BSP corresponding to the virtual CPU 600), the VMM 20 proceeds to S2320, and when the virtual BSP is operating on another physical CPU 60, the VMM 20 proceeds to S2325.

In S2320, the VMM 20 determines whether the interrupts suspended in the virtual PIC register 470 can be delivered to the virtual CPU 600, and when the interrupts can be delivered, the VMM 20 clears the interrupts in the virtual PIC register 470, and branches the processing performed by the virtual CPU 600 to the interrupt handler 300 of the OS 40.

In S2325, in order to execute the emulator 310 involved in the interrupt delivery process on another physical CPU 60, the VMM 20 transmits an physical inter-processor interrupt (IPI) by specifying an INIT interrupt, which is a type of a non-maskable interrupt (NMI). The physical CPU 60, upon receiving the INIT interrupt, in order to execute the VMM 20 independently of the setting of the interrupt interception flag 61, can cause a physical CPU 60 assigned in the exclusive form, which is the destination of the virtual interrupt, to execute the emulator.

In S2330, the VMM 20 refers to the interrupt parameter 490 of the I/O emulator 340 for emulating the virtual I/O device 1700, and the ID for interrupt 72 of the virtual LAPIC register 480, thereby identifying a virtual CPU 600 which is the destination of the interrupt from the virtual I/O device 1700, and proceeds to S2340.

In S2340, the VMM 20 refers to the virtual CPU management table 440, thereby determining whether the virtual CPU 600, which is the destination of the virtual interrupt, is assigned in the exclusive form or the mutual form. When the virtual CPU 600, which is the destination of the interrupt, is assigned in the exclusive form, the VMM 20 proceeds to S2370, and when the virtual CPU 600 is assigned in the mutual form, the VMM 20 proceeds to S2350.

In S2350, the virtual CPU 600 stores the interrupt in the virtual LAPIC register 480 for suspending the interrupt, and the VMM 20 proceeds to S2360.

In S2360, the VMM 20 determines whether the interrupts suspended in the virtual LAPIC register 480 can be delivered to the virtual CPU 600, and when the interrupts can be delivered, the VMM 20 clears the interrupts in the virtual LAPIC register 480, and branches the processing performed by the virtual CPU 600 to the interrupt handler 300 of the OS 40.

In S2370, the VMM 20 obtains the destination 230 and the vector 240 of the generated virtual interrupt from the interrupt parameter 490 of the I/O emulator 340 for emulating the virtual I/O device 1700, and transmits an inter-processor interrupt (IPI) to the CPU assigned in the exclusive form, which is the destination. Through this process, the CPU 60 assigned in the exclusive form, without calling the VMM 20, branches while passing the interrupt vector 240 of the I/O device 170 to the interrupt handler 300 of the OS 40.

(4. Summary)

According to the embodiment mentioned above, by using, in combination, CPUs 60 whose interrupt interception flag 61 is enabled, and which are thus assigned in the mutual form, and CPUs 60 whose interrupt interception flag 61 is disabled, and which are thus assigned in the exclusive form, and by changing the interrupt parameter 220 according to the usage form of a physical I/O device 170 and the usage form of a CPU 60 which is a destination of an interrupt from the physical I/O device 170, the interrupt delivery overhead can be eliminated when the virtual machine 30 is constituted by an I/O device 170 assigned in the dedicated form and a CPU 60 assigned in the exclusive form, and the emulator 310 can be always executed for an interrupt from an I/O device 170 assigned in the shared form. As a result, by using only the standard features supported by the x86-compatible machines, both the reduction in overhead of the interrupt from the I/O device 170 assigned in the dedicated form, and the execution of the emulator 310 required for the I/O device assigned in the shared form can be realized.

Moreover, according to this invention, the feature which is provided to the x86-compatible CPU 60, and intercepts a maskable interrupt from a physical I/O device 170 to cause the VMM 20, in place of the OS 40, to be executed, is referred to as interrupt interception feature to be used, and the flag for enabling and disabling the interrupt interception feature is referred to as interrupt interception flag. To the interrupt interception feature, the external interrupt exiting provided as a part of the VT-x feature by the Intel, and the Intercept INTR provided as a part of the AMD-V feature by the AMD correspond.

According to this invention, at least two x86-compatible physical CPUs 60 are used, and a code (interrupt handler) executed when an interrupt is received on the x86-compatible physical CPU 60 is set. When an interrupt is received from an I/O device 170, on at least one CPU 60, the interrupt interception flag is disabled, and, upon reception of an interrupt, the interrupt handler of the OS is executed. Then, on at least one CPU 60, the interrupt interception flag is enabled, and, upon reception of an interrupt, the emulator 310 of the VMM 20 is executed. Moreover, as the assignment form of the physical CPU 60 to the virtual CPU 600, the form in which the interrupt interception flag 61 is enabled and the form in which the interrupt interception flag is disabled can be selected.

When, to a virtual machine 30, a CPU 60 is assigned while the interrupt interception is enabled, a destination of an interrupt from a physical I/O device 170 used by the virtual machine 30 is set to the physical CPU 60 on which the interrupt interception is enabled.

When, to a virtual machine 30, an I/O device 170 is assigned in the dedicated form, and a CPU 60 is assigned while the interrupt interception is disabled, a destination of an interrupt from a corresponding physical I/O device 170 is set to a corresponding physical CPU 60.

When, to a virtual machine 30, an I/O device 170 is assigned in the shared form, and a CPU 60 is assigned while the interrupt interception is disabled, a destination of an interrupt from a corresponding physical I/O device 170 is set to a physical CPU 60 on which the interrupt interception is enabled. The emulator 310 to be executed upon reception of an interrupt delivers a maskable interrupt, by means of the inter processor interrupt (IPI) or the like, to a physical CPU 60 assigned to a virtual CPU 600 to receive an interrupt from a virtual I/O device 1700.

Second Embodiment

A description is now given of an embodiment in which this invention is combined with an interrupt remapping feature for replacing an interrupt parameter on the north bridge 120. In the following section, based on the accompanying figures, differences from the first embodiment are described.

(1. Hardware Configuration)

Figure 19:
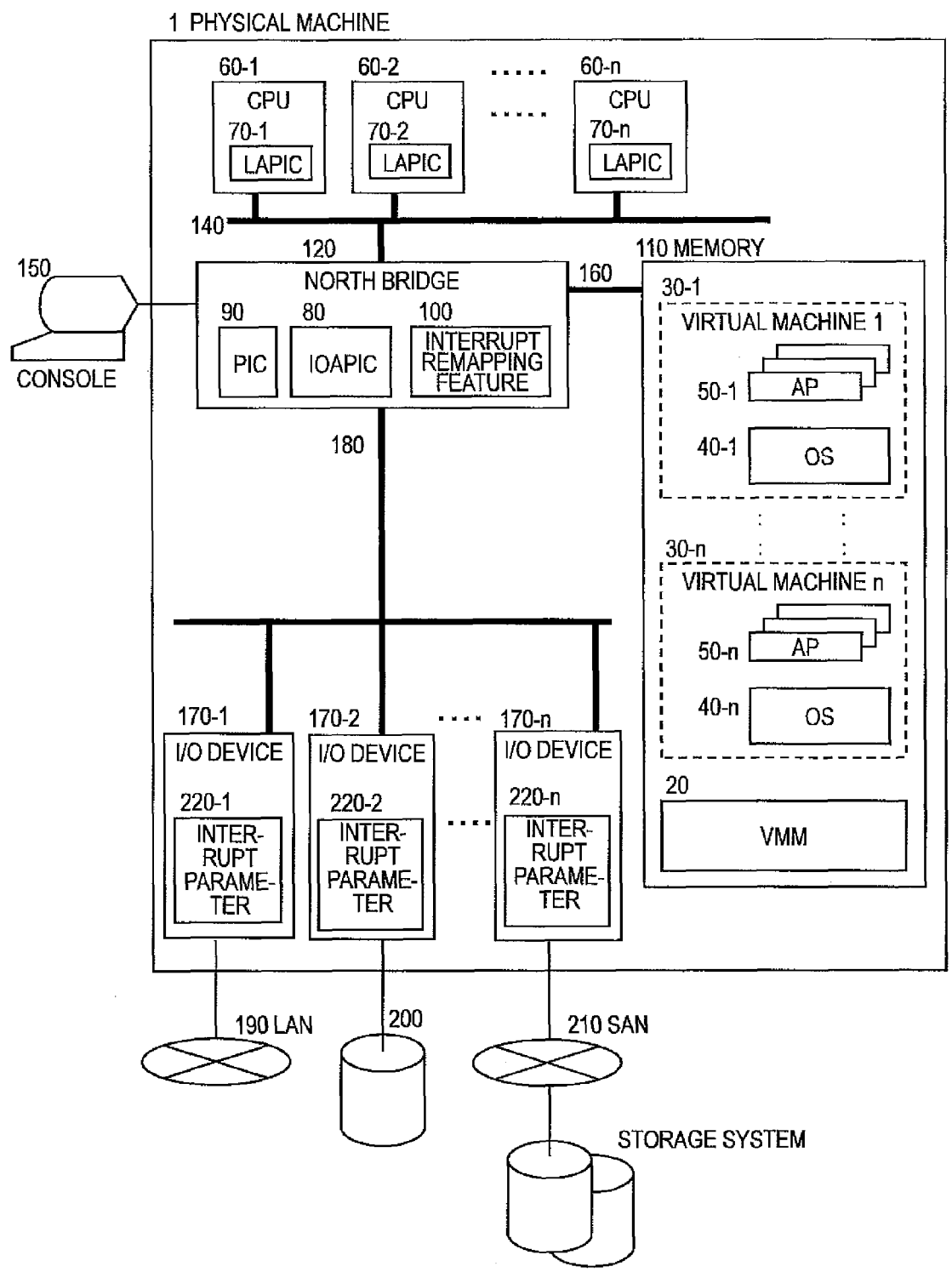
FIG. 19 illustrates the second embodiment, and is a block diagram of the physical machine 1 operating a virtual machine system.

A hardware configuration according to the second embodiment is, as illustrated in FIG. 19, different from the first embodiment only in components relating to the north bridge 120. The north bridge 120 is compliant with the VT-d of Intel or the IOMMU of AMD, and provided with an interrupt remapping feature 100 for replacing an interrupt parameter. FIG. 19 illustrates the second embodiment, and is a block diagram of the physical machine 1 operating a virtual machine system.

(2. Software Configuration)

Figure 20:
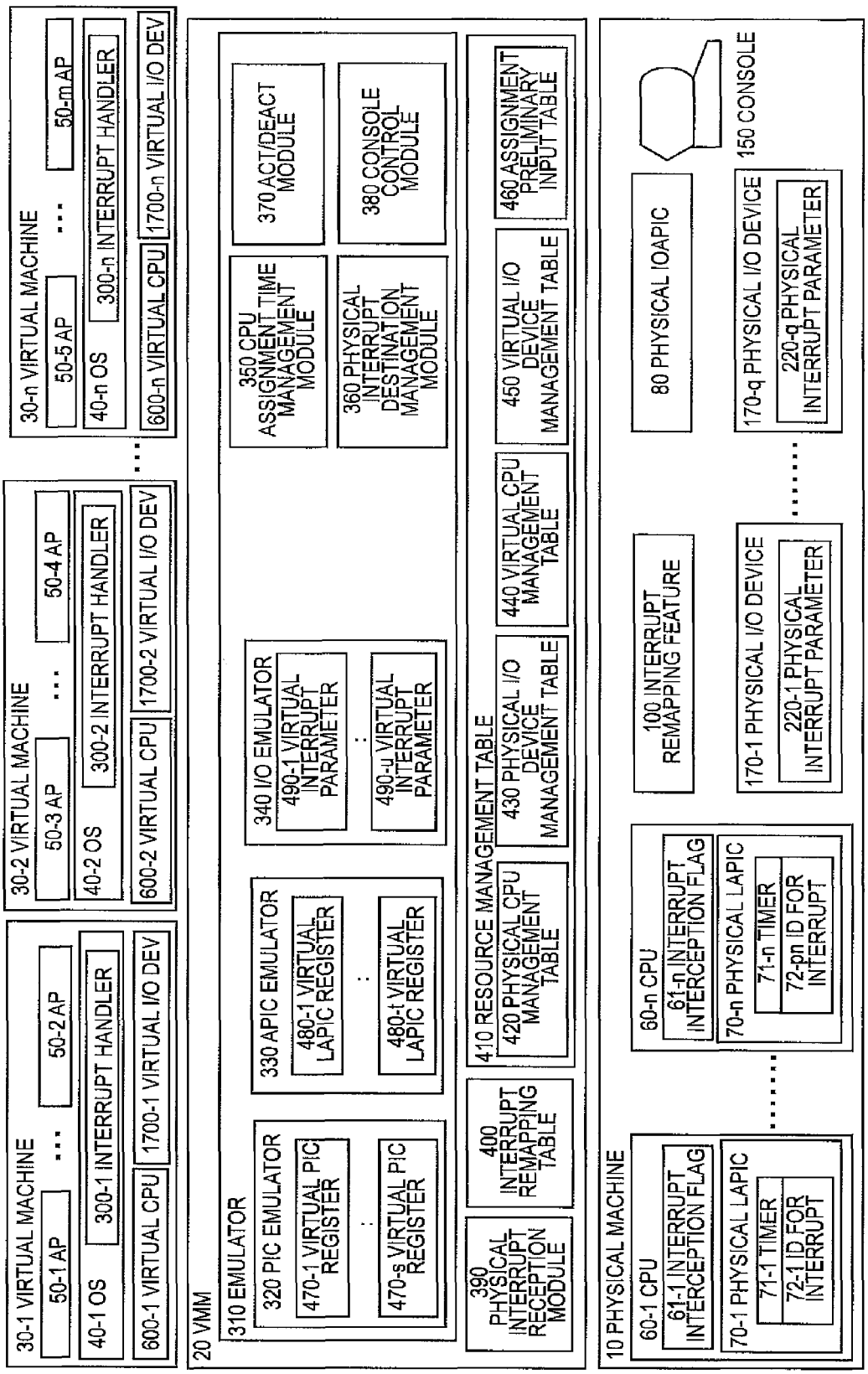
FIG. 20 illustrates the second embodiment of this invention, and is a stack diagram illustrating major parts of the software and hardware of the virtual machine system.

As illustrated in FIG. 20, a software configuration and hardware components to be controlled are different from those of the first embodiment only in components relating to the interrupt remapping feature of the physical machine 1 and the VMM 20. FIG. 20 is a stack diagram illustrating major parts of the software and hardware of the virtual machine system.

The physical machine 1 provides the interrupt remapping feature 100. Moreover, the VMM 20 includes an interrupt remapping table 400 corresponding to the interrupt remapping feature.

Figure 21:
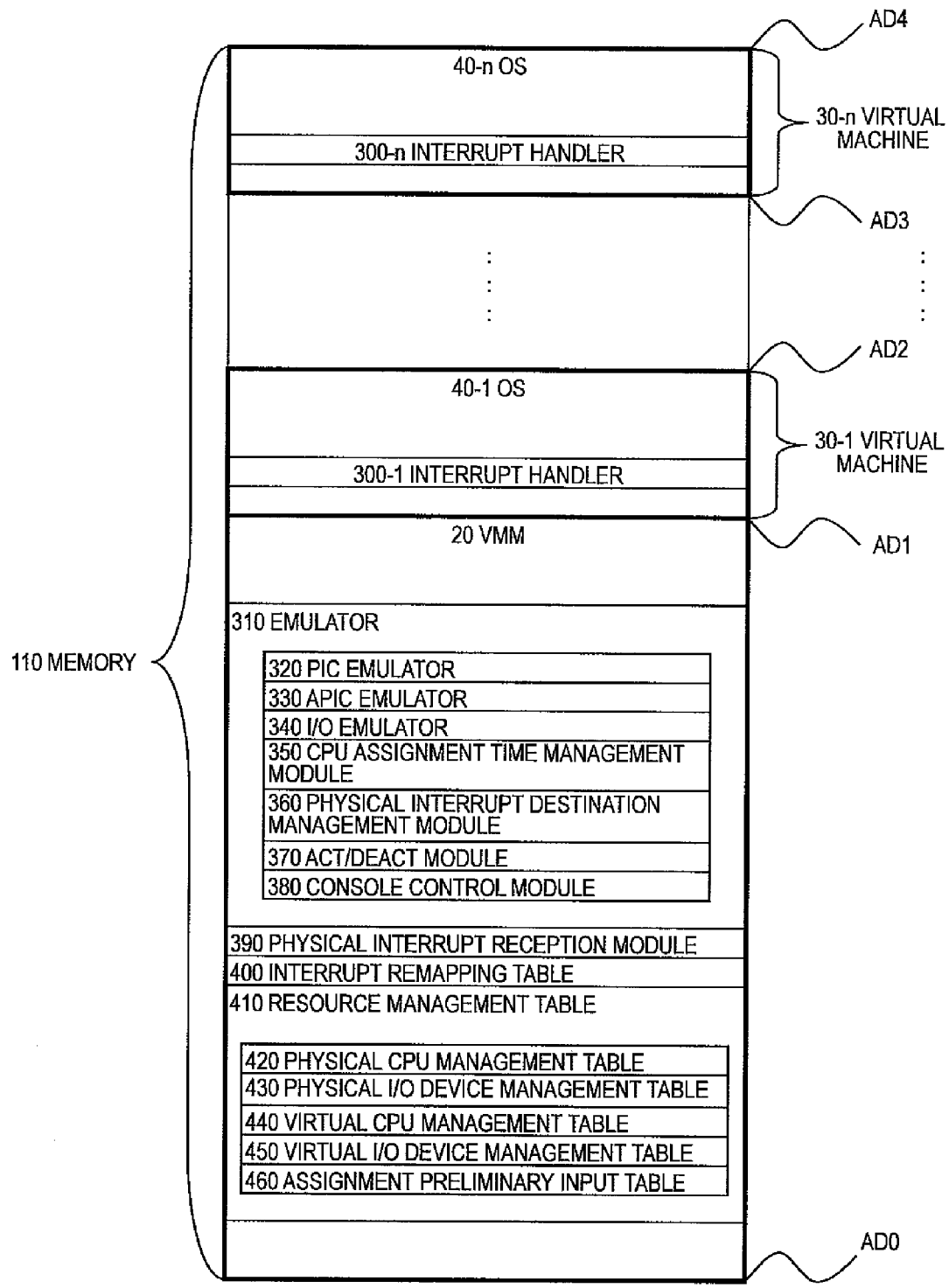
FIG. 21 illustrates the second embodiment of this invention, and is a map of the memory area.

The memory 110, as illustrated in FIG. 21, is different from that of the first embodiment only in the interrupt remapping table 400 present on the memory assigned to the VMM 20. FIG. 21 illustrates a map of the memory area according to the second embodiment.

Figure 22:
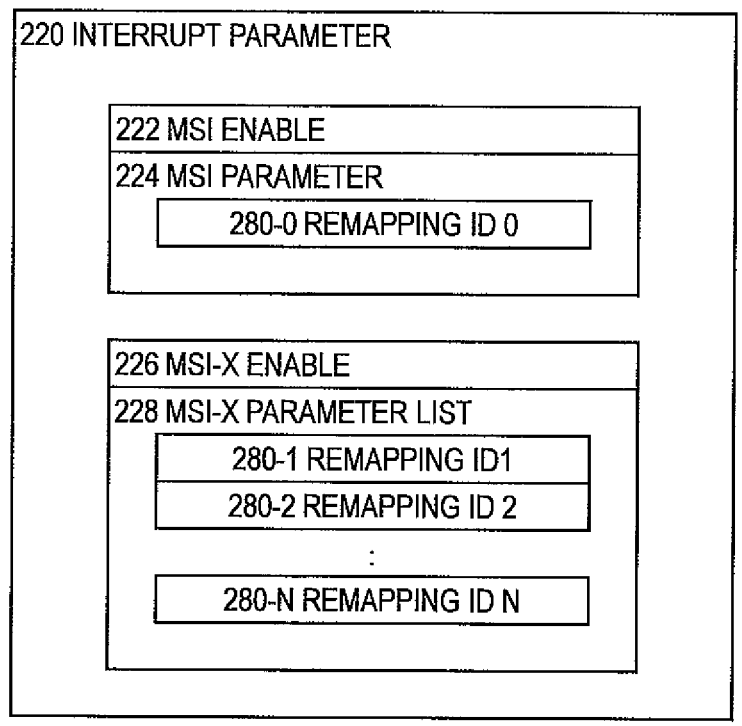
FIG. 22 illustrates the second embodiment, and is a configuration diagram of the interrupt parameter held by the I/O device.

As illustrated in FIG. 22, the interrupt parameter 220 is different from that of the first embodiment only in contents of the MSI parameter 224 and the MSI-X parameter list 228. FIG. 22 illustrates the second embodiment, and is a configuration diagram of the interrupt parameter held by the I/O device.

The MSI parameter 224 includes a remapping ID 280. The remapping ID 280 is an identification number for identifying an entry of the interrupt remapping table 400 used for replacing the interrupt parameter.

The MSI-X parameter list 228 includes a plurality of remapping IDs 280. The MSI-X provides a feature to deliver an interrupt with different destinations 230 and vectors 240 depending on a reason for an interrupt from an I/O device. In order to realize this feature, a plurality of entries are provided in correspondence with interrupt reasons, and the remapping ID 280 can be set to the each entry.

As illustrated in FIG. 23, the interrupt remapping table 400 is a table in which, to each remapping ID 280, the destination 230 and the vector 240 of the interrupt parameter 220 illustrated in FIG. 4 of the first embodiment are added. When the north bridge 120 is compliant with the VT-d, all the physical I/O devices 170 in the physical machine 1 refer to the single interrupt remapping table. On the other hand, when the north bridge 120 is compliant with the IOMMU, in place of the signal interrupt remapping table, different interrupt remapping tables for the respective physical I/O devices 170 may be used. FIG. 23 is an explanatory diagram illustrating the interrupt remapping table.

(3. Interrupt Delivery Process by VMM)

Next, a description is now given of an example of an interrupt delivery process carried out by the VMM 20 according to an operation of a guest referring to flowcharts.

(3.1. Overview of Interrupt Delivery Process by VMM)

FIGS. 10A to 10C according to the first embodiment are flowcharts illustrating the overall process when a guest is executed on the VMM 20, which can be applied to the second embodiment. Flowcharts according to the second embodiment are the same as those of the first embodiment except for S1230 and S1250 in which the destination of an interrupt is changed from a physical I/O device 170.

In S1230 of FIG. 10B, when, for a physical I/O device 170 assigned to a virtual machine 30 in the dedicated form, the execution of the emulator upon generation of an interrupt is not necessary, the VMM 20 sets the destination 230 of the interrupt remapping table 400 to an ID for interrupt 72 of a CPU 60 assigned in the exclusive form.

In S1250, for all physical I/O devices 170 assigned to the virtual machine 30 in the dedicated form, the VMM 20 sets the destination 230 of the interrupt remapping table 400 to the ID for interrupt 72 of a CPU 60 assigned in the mutual form.

(3.2. ACT/DEACT Process for Virtual Machine)

Of the ACT process carried out in S1030 and S1180 of FIGS. 10A and 10B of the first embodiment, a description is given referring to FIGS. 11A and 11B of the first embodiment. Flowcharts applied to the second embodiment are the same as those of the first embodiment except for S1430, S1440, and S1001 in which the destination of an interrupt is changed from a physical I/O device 170.

In S1001 of FIG. 10A, the VMM 20 recognizes the count of the physical CPUs and the types and the count of the physical I/O devices, initializes the data inside the VMM 20, and assigns serial numbers to the remapping IDs 280 of the interrupt parameter 220 of the physical I/O devices. Moreover, the VMM 20 initializes the interrupt remapping table 400, thereby enabling an interrupt to be delivered to the physical CPU 60, and proceeds to S1000.

In S1430 of FIG. 11A, the VMM 20, for all physical I/O devices 170 used in the dedicated form by an virtual machine 30 to be activated, changes the destination 230 of the interrupt remapping table 400 to the ID for interrupt 72 of a CPU 60 assigned in the mutual form, and proceeds to S1440. This process is caused by a fact that the initial value of the interrupt mode of an x86-compatible machine is the PIC mode. Only a set of two PICs 90 of the north bridge 120 are present on the physical machine 1, which is different from the LAPIC 70 of the CPU 60, and hence cannot be assigned in the dedicated form. Thus, when the virtual machine 30 is operating in the PIC mode, it is necessary to execute the PIC emulator 320 upon generation of an interrupt, and hence a CPU 60 assigned in the mutual form on which the VMM 20 is executed upon an interrupt receives the interrupt.

In S1440, the VMM 20, for all physical I/O devices 170 used in the shared form in the physical machine 1, changes the destination 230 of the interrupt remapping table 400 to the ID for interrupt 72 of a CPU 60 assigned in the mutual form, and proceeds to S1450.

The check process for the assignment preliminary input table carried out in S1400 of FIG. 11A is the same as that of the first embodiment, and hence a description thereof is omitted.

The initialization process for the virtual I/O device 1700 carried out in S1470 of FIG. 11A is the same as that of the first embodiment, and hence a description thereof is omitted.

The DEACT process carried out in S1150 of FIG. 10B is the same as that of the first embodiment, and hence a description thereof is omitted.

(3.3. Process of Changing Destination of Interrupt from Physical I/O Device)

A description is now given of an example in which, for the process of changing the destination of an interrupt from a physical I/O device assigned in the dedicated form to a CPU assigned in the exclusive form, which is carried out in S1230 of FIG. 10B, FIG. 13 according to the first embodiment is applied to the second embodiment.

In the loop from S1700 to S1790, the VMM 20 checks the setting of all the virtual I/O devices 1700 assigned to the virtual machine 30, and changes the interrupt remapping table 400 according to necessity.

In S1710, the VMM 20, by using the virtual I/O device management table 450 and the physical I/O device management table 430, determines whether a virtual I/O device 1700 is assigned to the subject virtual machine 30 in the dedicated form. When the virtual I/O device 1700 is assigned in the dedicated form, the VMM 20 proceeds to S1720, and, otherwise, proceeds to S1790.

In S1720, the VMM 20 refers to the interrupt parameter 490 of the virtual I/O device 1700, thereby checking whether the virtual I/O device 1700 has enabled the MSI-X. When the MSI-X is enabled, the VMM 20 proceeds to S1750, and when the MSI-X is disabled, the VMM 20 proceeds to S1730.

In S1730, the VMM 20, by using the destination 230 of the interrupt parameter 490 of the virtual I/O device 1700, the ID for interrupt 72 of the virtual LAPIC register 480, and the virtual CPU management table 440, determines whether the virtual CPU 600 to receive an interrupt from the virtual I/O device 1700 is a CPU assigned in the exclusive form. When the virtual CPU 600 to receive an interrupt is a CPU 60 assigned in the exclusive form, the VMM 20 proceeds to S1740, and when the virtual CPU 600 is a CPU assigned in the mutual form, the VMM 20 proceeds to S1790.

In S1740, the VMM 20 changes the destination 230 of an entry in the interrupt remapping table 400 corresponding to a remapping ID 280 specified in the MSI parameter 224 contained in the interrupt parameter 220 of the physical I/O device 170 assigned to the virtual I/O device 1700 to the ID for interrupt 72 of a physical CPU 60 assigned in the exclusive form to the virtual CPU 600 to receive an interrupt. Moreover, the VMM 20 makes the vector 240 of the same entry in the interrupt remapping table 400 coincide with the vector 240 specified in the interrupt parameter 490 of the virtual I/O device 1700 by the OS 40.

In the loop from S1750 to S1780, the VMM 20, for a combination of the MSI-X parameter list 228 of the physical I/O device 170 and the interrupt remapping table 400, checks setting and makes changes.

In S1760, the VMM 20, by using the destination 230 specified in the MSI-X parameter contained in the interrupt parameter 490 of the virtual I/O device 1700, the ID for interrupt 72 of the virtual LAPIC register 480, and the virtual CPU management table 440, determines whether the virtual CPU 600 to receive an interrupt from the virtual I/O device 1700 is a CPU assigned in the exclusive form. When the virtual CPU 600 to receive an interrupt is a CPU assigned in the exclusive form, the VMM 20 proceeds to S1770, and when the virtual CPU 600 is a CPU assigned in the mutual form, the VMM 20 proceeds to S1780.

In S1770, the VMM 20 changes the destination 230 of an entry in the interrupt remapping table 400 corresponding to a remapping ID 280 specified in the MSI-X parameter list 228 contained in the interrupt parameter 220 of the physical I/O device 170 assigned to the virtual I/O device 1700 to the ID for interrupt 72 of a physical CPU 60 assigned in the exclusive form to the virtual CPU 600 to receive an interrupt. Moreover, the VMM 20 makes the vector 240 of the same entry in the interrupt remapping table 400 coincide with the vector 240 specified in the interrupt parameter 490 of the virtual I/O device 1700 by the OS 40. The above-mentioned process can change a destination of an interrupt from a physical I/O device 170 assigned in the dedicated form to a CPU 60 assigned in the exclusive form.

A description is now given of an example in which, for the process of changing the destination of an interrupt from a physical I/O device 170 assigned in the dedicated form to a CPU assigned in the mutual form, which is carried out in S1250 of FIG. 10B and S1430 of FIG. 11A, FIG. 14 according to the first embodiment is applied to the second embodiment.

In the loop from S1900 to S2010, the VMM 20 checks the setting of all the virtual I/O devices 1700 assigned to the virtual machine 30, and changes the interrupt remapping table 400 according to necessity.

In S1910, the VMM 20, by referring to the virtual I/O device management table 450 and the physical I/O device management table 430, determines whether the virtual I/O device 1700 is assigned to the subject virtual machine 30 in the dedicated form. When the virtual I/O device 1700 is assigned in the dedicated form, the VMM 20 proceeds to S1920, and, otherwise, proceeds to S2010.

In S1920, the VMM 20 refers to the interrupt parameter 220 of the physical I/O device 170, thereby checking whether the physical I/O device 170 has enabled the MSI-X. When the MSI-X is enabled, the VMM 20 proceeds to S1960, and when the MSI-X is disabled, the VMM 20 proceeds to S1930.

In S1930, the VMM 20, by using the remapping ID 280 in the interrupt parameter 220 of the physical I/O device 170, the destination 230 specified in a corresponding entry in the interrupt remapping table 400, the ID for interrupt 72 of the physical LAPIC 70, and the physical CPU management table 420, determines whether the physical CPU 60 to receive an interrupt from the physical I/O device 170 is a CPU 60 assigned in the exclusive form. When the physical CPU 60 to receive an interrupt is a CPU assigned in the exclusive form, the VMM 20 proceeds to S1940, and when the physical CPU 60 is a CPU assigned in the mutual form, the VMM 20 proceeds to S2010.

In S1940, the VMM 20 selects, from the physical CPU management table 420, one physical CPU 60 assigned in the mutual form, and proceeds to S1950. According to this embodiment, the configuration in which the count of CPUs 60 assigned in the mutual form is 0 is prohibited, and thus, a physical CPU 60 assigned in the mutual form is always found.

In S1950, the VMM 20 changes the destination 230 of an entry in the interrupt remapping table 400 corresponding to a remapping ID 280 specified in the MSI parameter 224 contained in the interrupt parameter 220 of the physical I/O device 170 to the ID for interrupt 72 of the CPU 60 assigned in the mutual form selected in S1940. Moreover, the VMM 20 changes the vector 240 of the same entry in the interrupt remapping table 400 to a vector used for identifying an interrupt by the VMM 20.

In the loop from S1960 to S2000, the VMM 20, for a combination of the MSI-X parameter list 228 of the physical I/O device 170 and the interrupt remapping table 400, checks setting and makes changes.

In S1970, the VMM 20, by using the remapping ID 280 specified in the MSI-X parameter list contained in the interrupt parameter 220 of the physical I/O device 170, the destination 230 specified in a corresponding entry in the interrupt remapping table 400, the ID for interrupt 72 of the physical LAPIC 70, and the physical CPU management table 420, determines whether a physical CPU 60 to receive an interrupt from the physical I/O device is a CPU assigned in the exclusive form. When the physical CPU 60 to receive an interrupt is a CPU assigned in the exclusive form, the VMM 20 proceeds to S1980, and when the physical CPU 60 is a CPU assigned in the mutual form, the VMM 20 proceeds to S2000.

In S1980, the VMM 20 selects, from the physical CPU management table 420, one physical CPU 60 assigned in the mutual form, and proceeds to S1990. According to this embodiment, the configuration in which the count of CPUs 60 assigned in the mutual form is 0 is prohibited, and thus, a physical CPU 60 assigned in the mutual form is always found.

In S1990, the VMM 20 changes the destination 230 of an entry in the interrupt remapping table 400 corresponding to a remapping ID 280 specified in the MSI-X parameter list 228 contained in the interrupt parameter 220 of the physical I/O device 170 to the ID for interrupt 72 of the CPU 60 assigned in the mutual form selected in S1980. Moreover, the VMM 20 changes the vector 240 of the same entry in the interrupt remapping table 400 to a vector used for identifying an interrupt by the VMM 20.

A description is now given of a case in which, for the process of changing the destination of an interrupt from a physical I/O device assigned in the dedicated form to a CPU assigned in the mutual form, which is carried out in S1440 of FIG. 11A, FIG. 15 according to the first embodiment is applied to the second embodiment.

In the loop from S2020 to S2030 of FIG. 15, the VMM 20 checks, for all the physical I/O devices 170 in the physical machine 1, setting in the interrupt remapping table 400, and changes the interrupt remapping table 400 depending on necessity.

In S2025, the VMM 20, by using the physical I/O device management table 430, determines whether a physical I/O device 170 is used while it is assigned in the shared form. When the physical I/O device 170 is used while it is assigned in the shared form, the VMM 20 proceeds to S1920, and, otherwise, proceeds to S2030.

Processing from S1920 to S2000 is the same as that denoted by the same numbers in FIG. 15 according to the first embodiment, and hence a description thereof is omitted.

A description is now given of a case in which, for the process of changing the destination of an interrupt from a physical I/O device assigned in the shared form to a CPU assigned in the mutual form, (3.4. Delivery Process for New Virtual Interrupt)

A new virtual interrupt carried out in S1300 of FIG. 10C is the same as that of the first embodiment, and hence a description thereof is omitted.

(4. Summary)

According to the second embodiment mentioned above, by using, in combination, CPUs 60 whose interrupt interception flag 61 is enabled, and which are thus assigned in the mutual form, and CPUs 60 whose interrupt interception flag 61 is disabled, and which are thus assigned in the exclusive form, and by changing the interrupt remapping table 400 according to the usage form of a physical I/O device 170 and the usage form of a CPU 60 which is a destination of an interrupt from the physical I/O device 170, the interrupt delivery overhead can be eliminated when the virtual machine 30 is constituted by an I/O device 1700 assigned in the dedicated and a CPU 60 assigned in the exclusive form, and the emulator 310 can be always executed for an interrupt from an I/O device 170 assigned in the shared form.

As described above, this invention can be applied to the virtual machine system provided with the x86-compatible CPUs and the virtualization software.

While the present invention has been described in detail and pictorially in the accompanying drawings, the present invention is not limited to such detail but covers various obvious modifications and equivalent arrangements, which fall within the purview of the appended claims.

What is claimed is:

1. A control method for a virtual machine for executing a virtualization module for providing a virtual machine operating on a physical machine, the physical machine comprising:
    a plurality of physical CPUs; and
    a physical memory, the virtualization module comprising a predetermined emulator, the virtualization module operating an OS on the virtual machine, the plurality of physical CPUs being capable of setting an interrupt handler executed upon reception of an interrupt from the virtual machine, the control method comprising:

executing, on at least one first physical CPU out of the plurality of physical CPUs, the OS upon the reception of the interrupt; and executing, on at least one second physical CPU out of the plurality of physical CPUs, the predetermined emulator upon the reception of the interrupt;

wherein:

the physical machine further comprises at least one physical I/O device;

the virtualization module provides, to the virtual machine, at least one virtual CPU and at least one virtual I/O device;

the control method further comprises:

assigning, by the virtualization module, to the at least one virtual I/O device constituting the virtual machine, the at least one physical I/O device one of in a first form in which the at least one physical I/O device is directly used by the single virtual machine, and in a second form in which the at least one physical I/O device is indirectly used via the predetermined emulator by a plurality of the virtual machines; and assigning, by the virtualization module, to the at least one virtual CPU constituting the virtual machine, one of the plurality of physical CPUs one of in a third form in which the one of the plurality of physical CPUs executes the OS upon the reception of the interrupt, and in a fourth form in which the one of the plurality of physical CPUs executes the predetermined emulator upon the reception of the interrupt;

the executing, on the at least one first physical CPU out of the plurality of physical CPUs, the OS upon the reception of the interrupt comprises executing the OS, upon reception of an interrupt from the at least one physical I/O device, by the one of the plurality of physical CPUs, when, to the at least one virtual I/O device constituting the virtual machine, the at least one physical I/O device is assigned in the first form in which the at least one physical I/O device is directly used by the single virtual machine, and when, to the at least one virtual CPU constituting the virtual machine, the one of the plurality of physical CPUs is assigned in the third form in which the one of the plurality of physical CPUs executes the OS upon the reception of the interrupt; and the executing, on the at least one second physical CPU out of the plurality of physical CPUs, the predetermined emulator upon the reception of the interrupt comprises executing the predetermined emulator, upon the reception of the interrupt from the at least one physical I/O device, by the one of the plurality of physical CPUs, one of when, to the at least one virtual I/O device constituting the virtual machine, the at least one physical I/O device is assigned in the second form in which the at least one physical I/O device is indirectly used via the predetermined emulator by the plurality of the virtual machines, and when, to the at least one virtual CPU constituting the virtual machine, the one of the plurality of physical CPUs is assigned in the fourth form in which the one of the plurality of physical CPUs executes the predetermined emulator upon the reception of the interrupt.

2. The control method for a virtual machine according to claim 1, wherein:

the plurality of physical CPUs each comprise an x86-compatible physical CPU compliant with one of a VT-x and an AMD-V, and the plurality of physical CPUs each comprise one of an External Interrupt Exiting feature and an Intercept INTR feature as an interrupt interception feature for executing the predetermined emulator upon reception of a maskable interrupt;

the control method further comprises:

disabling the interrupt interception feature on at least one of the plurality of physical CPUs; and enabling the interrupt interception feature on the at least one of the plurality of physical CPUs;

the executing, on the at least one first physical CPU out of the plurality of physical CPUs, the OS upon the reception of the interrupt further comprises executing the OS by the at least one of the plurality of CPUs, on which the interrupt interception feature is disabled, by receiving the interrupt from the at least one physical I/O device, when, to the at least one virtual I/O device constituting the virtual machine, the at least one physical I/O device is assigned in the first form, and when, to the at least one virtual CPU constituting the virtual machine, the one of the plurality of physical CPUs is assigned in the third form; and the executing, on the at least one second physical CPU out of the plurality of physical CPUs, the predetermined emulator upon the reception of the interrupt further comprises executing the predetermined emulator by the at least one of the plurality of physical CPUs, on which the interrupt interception feature is enabled, by receiving the interrupt from the at least one physical I/O device, the one of when, to the at least one virtual I/O device constituting the virtual machine, the one of the plurality of physical CPUs is assigned in the second form, and when, to the at least one virtual CPU constituting the virtual machine, the at least one of the plurality of physical CPUs is assigned in the fourth form.

3. The control method for a virtual machine according to claim 1, wherein:

the physical machine further comprises a module for defining the one of the plurality of physical CPUs which is a destination of the interrupt from the at least one physical I/O device; and the executing, on the at least one first physical CPU out of the plurality of physical CPUs, the OS upon the reception of the interrupt further comprises changing, when, to the at least one virtual I/O device constituting the virtual machine, the at least one physical I/O device is assigned in the first form, when the OS refers to the module and changes the destination of the interrupt from the at least one virtual I/O device, and when, to the at least one virtual CPU specified as the destination, the one of the plurality of physical CPUs is assigned in the third form, the destination of the interrupt from the at least one physical I/O device to the one of the plurality of physical CPUs.

4. The control method for a virtual machine according to claim 1, wherein:

the plurality of physical CPUs each comprise a CPU which can set the interrupt handler executed upon reception of a maskable interrupt; and the executing, on the at least one second physical CPU out of the plurality of physical CPUs, the predetermined emulator upon the reception of the interrupt comprises delivering, when, to the at least one virtual I/O device constituting the virtual machine, the at least one physical I/O device is assigned in the second form, and when, to the at least one virtual CPU specified as a destination of the interrupt from the at least one virtual I/O device, the one of the plurality of physical CPUs is assigned in the third form, by the predetermined emulator which has received the interrupt from the at least one physical I/O device, a maskable physical interrupt to the one of the plurality of physical CPUs.

5. The control method for a virtual machine according to claim 1, wherein:

the plurality of physical CPUs each comprise a CPU which can execute the predetermined emulator upon reception of a non-maskable interrupt; and the executing, on the at least one first physical CPU out of the plurality of physical CPUs, the OS upon the reception of the interrupt further comprises delivering, when the one of the plurality of physical CPUs assigned in the third form is caused to execute the predetermined emulator, the non-maskable interrupt to the one of the plurality of physical CPUs.

6. A non-transitory machine-readable medium storing a control program for a virtual machine for providing, on a physical machine comprising a plurality of physical CPUs, a physical memory, and at least one physical I/O device, a virtual machine comprising a predetermined emulator, and operating an OS on the virtual machine, the physical machine further comprising a module for defining one of the plurality of physical CPUs which is a destination of an interrupt from the at least one physical I/O device, the plurality of physical CPUs being capable of setting an interrupt handler executed upon reception of the interrupt, the control program controlling the physical machine to execute the procedures of:

providing the virtual machine with at least one virtual CPU and at least one virtual I/O device;

assigning, to the at least one virtual I/O device constituting the virtual machine, the at least one physical I/O device one of in a first form in which the at least one physical I/O device is directly used by the single virtual machine, and in a second form in which the at least one physical I/O device is indirectly used via the predetermined emulator by a plurality of the virtual machines;

assigning, to the at least one virtual CPU constituting the virtual machine, the one of the plurality of physical CPUs one of in a third form in which the one of the plurality of physical CPUs executes the OS upon the reception of the interrupt, and in a fourth form in which the one of the plurality of physical CPUs executes the predetermined emulator upon the reception of the interrupt;

setting, when a form of the assigning the one of the plurality of physical CPUs to the at least one virtual CPU is the third form in which the one of the plurality of physical CPUs executes the OS upon the reception of the interrupt, the interrupt handler executed upon the reception of the interrupt to the OS; setting, when the form of the assigning the one of the plurality of physical CPUs to the at least one virtual CPU is the fourth form, the interrupt handler executed upon the reception of the interrupt to the predetermined emulator;

setting, when the form of the assigning the at least one physical I/O device to the at least one virtual I/O device is the second form, the destination of the interrupt from the at least one physical I/O device to the one of the plurality of physical CPUs assigned in the fourth form;

setting, when the form of the assigning the at least one physical I/O device to the at least one virtual I/O device is the first form, and when, to the at least one virtual CPU which is the destination of the interrupt from the at least one virtual I/O device, the one of the plurality of physical CPUs is assigned in the third form, the destination of the interrupt from the at least one physical I/O device to the one of the plurality of physical CPUs, and setting, when, to the at least one virtual I/O device, the at least one physical I/O device is assigned in the first form, and when, to the at least one virtual CPU which is the destination of the interrupt from the at least one virtual I/O device, the one of the plurality of physical CPUs is assigned in the fourth form, the destination of the interrupt from the at least one physical I/O device to the one of the plurality of physical CPUs assigned in the fourth form.

7. The non-transitory machine-readable medium storing a control program for a virtual machine according to claim 6, the control program further controlling the physical machine to execute the procedures of:

receiving an instruction regarding the form of the assigning the one of the plurality of physical CPUs to the at least one virtual CPU; and receiving an instruction regarding the form of the assigning the at least one physical I/O device to the at least one virtual I/O device.

8. The non-transitory machine-readable medium storing a control program for a virtual machine according to claim 6, the control program further controlling the physical machine to execute a procedure of determining that a configuration in which all the plurality of physical CPUs are used in the third form is abnormal.

9. The non-transitory machine-readable medium storing a control program for a virtual machine according to claim 6, the plurality of physical CPUs each comprising an x86-compatible physical CPU compliant with one of a VT-x and an AMD-V, and the plurality of physical CPUs each comprising one of an External Interrupt Exiting feature and an Intercept INTR feature as an interrupt interception feature for executing the predetermined emulator upon reception of a maskable interrupt, the virtual machine further comprising, as a virtual interrupt controller, a virtual PIC and a virtual APIC, the control program further controlling the physical machine to execute the procedures of:

setting, when the OS is using the virtual PIC, the destination of the interrupt from the at least one physical I/O device assigned to the virtual machine to the one of the plurality of physical CPUs assigned in the fourth form;

setting, when the OS is using the virtual APIC, and when the at least one physical I/O device is assigned to the virtual machine in the second form, the destination of the interrupt from the at least one physical I/O device to the one of the plurality of physical CPUs in the fourth form;

setting, when the OS is using the virtual APIC, when, to the at least one virtual CPU which is the destination of the interrupt from the at least one virtual I/O device constituting the virtual machine, the one of the plurality of physical CPUs is assigned in the third form, and when, to the at least one virtual I/O device, the at least one physical I/O device is assigned in the first form, the destination of the interrupt from the at least one physical I/O device to the one of the plurality of physical CPUs; and setting, when the OS is using the virtual APIC, when, to the at least one virtual CPU which is the destination of the interrupt from the at least one virtual I/O device constituting the virtual machine, the one of the plurality of physical CPUs is assigned in the fourth form, and when, to the at least one virtual I/O device, the at least one physical I/O device is assigned in the first form, the destination of the interrupt from the at least one physical I/O device to the one of the plurality of physical CPUs assigned in the fourth form.

10. The non-transitory machine-readable medium storing a control program for a virtual machine according to claim 6, the control program further controlling the physical machine to execute a procedure of setting, when, to the at least one virtual I/O device constituting the virtual machine, the at least one physical I/O device is assigned in the first form, when the OS changes the destination of the interrupt from the at least one virtual I/O device, and when, to the at least one virtual CPU specified as the destination, the one of the plurality of physical CPUs is assigned in the third form, the destination of the interrupt from the at least one physical I/O device to the one of the plurality of physical CPUs.

11. The non-transitory machine-readable medium storing a control program for a virtual machine according to claim 6, the plurality of physical CPUs each comprising a CPU which can set the interrupt handler executed upon reception of a maskable interrupt, the control program further controlling the physical machine to execute a procedure of delivering, when, to the at least one virtual I/O device constituting the virtual machine, the at least one physical I/O device is assigned in the second form, and when, to the at least one virtual CPU specified as the destination of the interrupt regarding the at least one virtual I/O device, the one of the plurality of physical CPUs is assigned in the third form, by the predetermined emulator which has received the interrupt from the at least one physical I/O device, a maskable physical interrupt to the one of the plurality of physical CPUs.

12. The non-transitory machine-readable medium storing a control program for a virtual machine according to claim 6, the plurality of physical CPUs each comprising a CPU which can execute the predetermined emulator upon reception of a non-maskable interrupt, the control program further controlling the physical machine to execute a procedure of delivering, when the one of the plurality of physical CPUs assigned in the third form is caused to execute the predetermined emulator, the non-maskable interrupt to the one of the plurality of physical CPUs.

13. A computer system, comprising:
a plurality of physical CPUs;
a memory; and
at least one physical I/O device,
the computer device being capable of setting a destination of an interrupt from the at least one physical I/O device, wherein:
the at least one physical I/O device comprises:
an interrupt destination storage module for storing an identifier of one of the plurality of physical CPUs to which the interrupt is to be delivered; and
a virtualization module for providing a virtual machine for generating a virtual CPU and a virtual I/O device, and operating at least one OS;
the virtualization module comprises:
an emulator for taking over a predetermined process;
first information holding, as an assignment form of the one of the plurality of physical CPUs to the virtual CPU, for each of the plurality of physical CPUs, one of a third form in which an OS code is executed upon reception of the interrupt, and a fourth form in which the emulator is executed upon reception of an interrupt;
second information holding a correspondence between the virtual CPU and the each of the plurality of physical CPUs;
third information holding, as an assignment form of the at least one physical I/O device, one of a first form in which the at least one physical I/O device is directly used by the single virtual machine, and a second form in which the at least one physical I/O device is indirectly used via the emulator by a plurality of the virtual machines; and
fourth information holding a correspondence between the virtual I/O device and the at least one physical I/O device; and
the emulator is configured to:
set, when the at least one physical I/O device is assigned in the second form, the destination of the interrupt from the at least one physical I/O device to the one of the plurality of physical CPUs assigned in the fourth form;
set, when, to the virtual I/O device, the at least one physical I/O device is assigned in the first form, and when, to the virtual CPU which is the destination of the interrupt from the virtual I/O device, the one of the plurality of physical CPUs is assigned in the third form, the destination of the interrupt from the at least one physical I/O device to the one of the plurality of physical CPUs, and
set, when, to the virtual I/O device, the at least one physical I/O device is assigned in the first form, and when, to the virtual CPU which is the destination of the interrupt from the virtual I/O device, the one of the plurality of physical CPUs is assigned in the fourth form, the destination of the interrupt from the at least one physical I/O device to the one of the plurality of physical CPUs assigned in the fourth form.

14. The computer system according to claim 13, further comprising an interface for receiving a correspondence between the virtual CPU and the virtual I/O device which constitute the virtual machine, and the each of the plurality of physical CPUs and the at least one physical I/O device, wherein the interface is configured to:
receive the count of the virtual CPUs constituting the virtual machine;
receive, as the assignment form of the one of the plurality of physical CPUs to the virtual CPU, at least one of the third form and the fourth form; and
receive, as the assignment form of the at least one physical I/O device to the virtual I/O device, at least one of the first form and the second form.

15. The computer system according to claim 13, wherein the emulator determines that a case in which all the plurality of physical CPUs are set in the third form is abnormal.

16. The computer system according to claim 13, wherein;
the plurality of physical CPUs each comprise an x86-compatible physical CPU compliant with one of a VT-x and an AMD-V, and the plurality of physical CPUs each comprise one of an External Interrupt Exiting feature and an Intercept INTR feature as an interrupt interception feature for executing the emulator upon reception of a maskable interrupt;
the emulator comprises, as a virtual interrupt controller, a virtual PIC and a virtual APIC;
the emulator is further configured to:
set, when the OS is using the virtual PIC, the destination of the interrupt from the at least one physical I/O device assigned to the virtual machine to the one of the plurality of physical CPUs assigned in the fourth form;
set, when the OS is using the virtual APIC, and when the at least one physical I/O device is assigned to the virtual I/O device in the second form, the destination of the interrupt from the at least one physical I/O device to the one of the plurality of physical CPUs assigned in the fourth form;
set, when the OS is using the virtual APIC, when, to the virtual I/O device, the at least one physical I/O device is assigned in the first form, and when, to the virtual CPU which is the destination of the interrupt from the virtual I/O device, the one of the plurality of physical CPUs is assigned in the third form, the destination of the interrupt from the at least one physical I/O device to the one of the plurality of physical CPUs; and
set, when the OS is using the virtual APIC, when, to the virtual I/O device, the at least one physical I/O device is assigned in the first form, and when, to the virtual CPU which is the destination of the interrupt from the virtual I/O device, the one of the plurality of physical CPUs is assigned in the fourth form, the destination of the interrupt from the at least one physical I/O device to the one of the plurality of physical CPUs assigned in the fourth form.

17. The computer system according to claim 13, wherein the emulator sets, when, to the virtual I/O device constituting the virtual machine, the at least one physical I/O device is assigned in the first form, when the OS changes the destination of the interrupt from the virtual I/O device, and when, to the virtual CPU specified as the destination, the one of the plurality of physical CPUs is assigned in the third form, the destination of the interrupt from the at least one physical I/O device to the one of the plurality of physical CPUs.

18. The computer system according to claim 13, wherein:
the plurality of physical CPUs each comprise a CPU which can set a code executed upon reception of a maskable interrupt; and
the emulator delivers, when, to the virtual I/O device constituting the virtual machine, the at least one physical I/O device is assigned in the second form, and when, to the virtual CPU specified as the destination of the interrupt regarding the virtual I/O device, the one of the plurality of physical CPUs is assigned in the third form, upon the reception of the interrupt from the at least one physical I/O device, a maskable physical interrupt to the one of the plurality of physical CPUs.

19. The computer system according to claim 13, wherein:

the plurality of physical CPUs each comprise a CPU which can execute the emulator upon reception of a non-maskable interrupt; and the emulator delivers, when the one of the plurality of physical CPUs assigned in the third form is caused to execute the emulator, the non-maskable interrupt to the one of the plurality of physical CPUs.

* * * * *